(12) United States Patent  (10) Patent No.: US 9,225,610 B2
Murase et al.  (45) Date of Patent: Dec. 29, 2015

(54) USER INTERFACE PROVIDING INFORMATION SYSTEM TOPOLOGY PRESENTATION

(75) Inventors: Atsushi Murase, Sunnyvale, CA (US); Tetsuya Masuishi, San Jose, CA (US); Takahiro Fujita, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 1553 days.

(21) Appl. No.: 12/078,372

(22) Filed: Mar. 31, 2008

(65) Prior Publication Data

US 2009/0249213 A1  Oct. 1, 2009

(51) Int. Cl.
*H04L 12/24* (2006.01)
*G06F 9/44* (2006.01)

(52) U.S. Cl.
CPC ............. *H04L 41/22* (2013.01); *G06F 9/4443* (2013.01); *H04L 41/12* (2013.01)

(58) Field of Classification Search
CPC ......... G06F 3/00; G06F 3/048; G06F 9/4443; H04L 41/22; H04L 41/0213; H04L 29/08072; H04L 29/06; H04L 41/12; H04L 43/00; H04L 12/2602; H04L 29/0809
USPC .................................................. 715/853, 734
See application file for complete search history.

(56) References Cited

U.S. PATENT DOCUMENTS

| | | | |
|---|---|---|---|
| 5,606,654 A * | 2/1997 | Schuur | 345/440 |
| 5,734,824 A * | 3/1998 | Choi | 709/224 |
| 5,835,094 A * | 11/1998 | Ermel et al. | 715/848 |
| 5,910,803 A * | 6/1999 | Grau et al. | 715/734 |
| 6,100,883 A * | 8/2000 | Hoarty | 715/721 |
| 6,259,451 B1 * | 7/2001 | Tesler | 345/419 |
| 6,944,830 B2 * | 9/2005 | Card et al. | 715/853 |

(Continued)

FOREIGN PATENT DOCUMENTS

| GB | 2 371 441 | 7/2002 |
|---|---|---|
| JP | 2000078132 | 3/2000 |

(Continued)

OTHER PUBLICATIONS

Onaro Intelligence Storage Delivery, SANscreen Technical Overview, Dec. 2007.

(Continued)

*Primary Examiner* — Doon Chow
*Assistant Examiner* — Le Nguyen
(74) *Attorney, Agent, or Firm* — Mattingly & Malur, PC

(57) ABSTRACT

A user interface includes a graphical topological representation of an information system. Information is collected regarding connections between switches, storage nodes and computer nodes in the information system. Any sub networks in the system are identified based on the collected information and classified as LANs or SANs. Connections between the various components are determined, and a layout of any identified LANs, computer nodes, SANs, and storage nodes is established for generating the topological representation in the user interface. The graphical topological representation of the information system is displayed in the user interface with the LAN icons, computer node icons, SAN icons and storage node icons laid out in a matrix-like arrangement of columns and rows, such that for LANs, computer nodes, SANs and/or storage nodes that are connected to each other, the corresponding icons are located on or near a same row in the graphical topological representation.

55 Claims, 33 Drawing Sheets

User Interface with Topology Presentation and Sorting/Filtering

(56) References Cited

U.S. PATENT DOCUMENTS

| | | |
|---|---|---|
| 7,107,534 B1 | 9/2006 | De Jong et al. |
| 7,249,347 B2 | 7/2007 | Chang et al. |
| 7,315,985 B1 | 1/2008 | Gauvin et al. |
| 7,603,632 B1* | 10/2009 | Aamodt et al. ............... 715/853 |
| 7,681,130 B1* | 3/2010 | Lavallee et al. ............... 715/735 |
| 7,689,570 B2* | 3/2010 | Fuchs ........................... 707/805 |
| 8,060,822 B2* | 11/2011 | Ishimitsu et al. ............. 715/713 |
| 2002/0113816 A1* | 8/2002 | Mitchell et al. ............... 345/734 |
| 2002/0175956 A1 | 11/2002 | Hand et al. |
| 2003/0004836 A1* | 1/2003 | Otter et al. ...................... 705/27 |
| 2004/0098474 A1 | 5/2004 | Galou et al. |
| 2005/0066293 A1* | 3/2005 | Hunt ............................. 715/854 |
| 2005/0091361 A1 | 4/2005 | Bernstein et al. |
| 2005/0114795 A1* | 5/2005 | Beaudoin ...................... 715/854 |
| 2005/0198247 A1* | 9/2005 | Perry et al. .................... 709/223 |
| 2006/0074735 A1 | 4/2006 | Shukla et al. |
| 2006/0125847 A1 | 6/2006 | Andreev et al. |
| 2006/0206837 A1* | 9/2006 | Steiner .......................... 715/854 |
| 2006/0256711 A1 | 11/2006 | Kusama et al. |
| 2007/0078988 A1* | 4/2007 | Miloushev et al. ........... 709/227 |
| 2007/0079255 A1* | 4/2007 | Gourdol et al. ............... 715/815 |
| 2007/0094597 A1 | 4/2007 | Rostom |
| 2007/0156861 A1 | 7/2007 | Nedelcu et al. |
| 2007/0204231 A1 | 8/2007 | Cunningham et al. |
| 2008/0133854 A1* | 6/2008 | Fukuguchi ..................... 711/161 |
| 2009/0031239 A1* | 1/2009 | Coleran et al. ................ 715/771 |
| 2009/0276771 A1* | 11/2009 | Nickolov et al. ............. 717/177 |

FOREIGN PATENT DOCUMENTS

| | | |
|---|---|---|
| JP | 2006-079350 A | 3/2006 |
| JP | 2006-107478 A | 4/2006 |
| JP | 2006-157891 A | 6/2006 |
| JP | 2007-299360 A | 11/2007 |

OTHER PUBLICATIONS

Hitachi, "Hitachi HiCommand® Storage Services Manager Software Performance and Scalability", Dec. 2006.
Screen Shots, Nagios Version 3.0, Nagios Enterprises, LLC., www.nagios.org, Dec. 17, 2007.
Microsoft System Center, "Controlling Costs and Driving Agility in the Datacenter", pp. 4-19, Nov. 2007.
European Patent Office, "International Search Report", International application No. PCT/JP2008/073497, mailed May 8, 2009, 4 pages.
European Patent Office, "Written Opinion of the International Searching Authority", International application No. PCT/JP2008/073497, mailed May 8, 2009, 7 pages.
Japanese Office Action received in corresponding Japanese Application No. 2013-273581 dated Feb. 3, 2015.

* cited by examiner

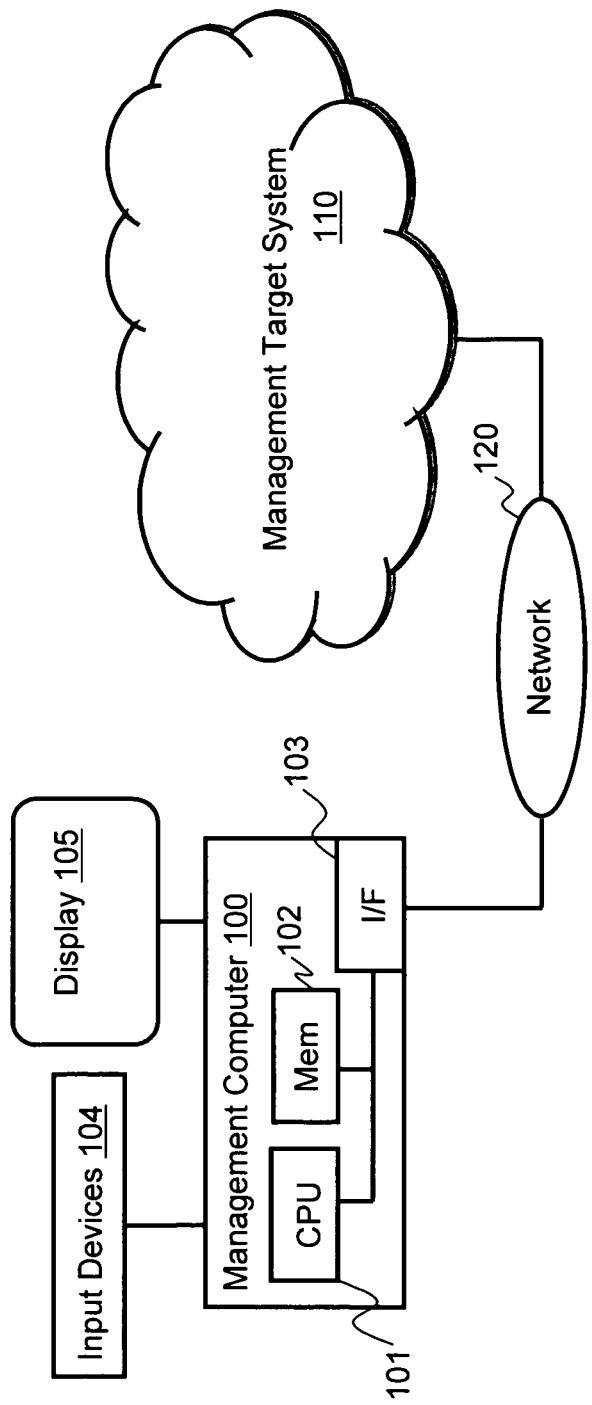
FIG. 1 Hardware Architecture

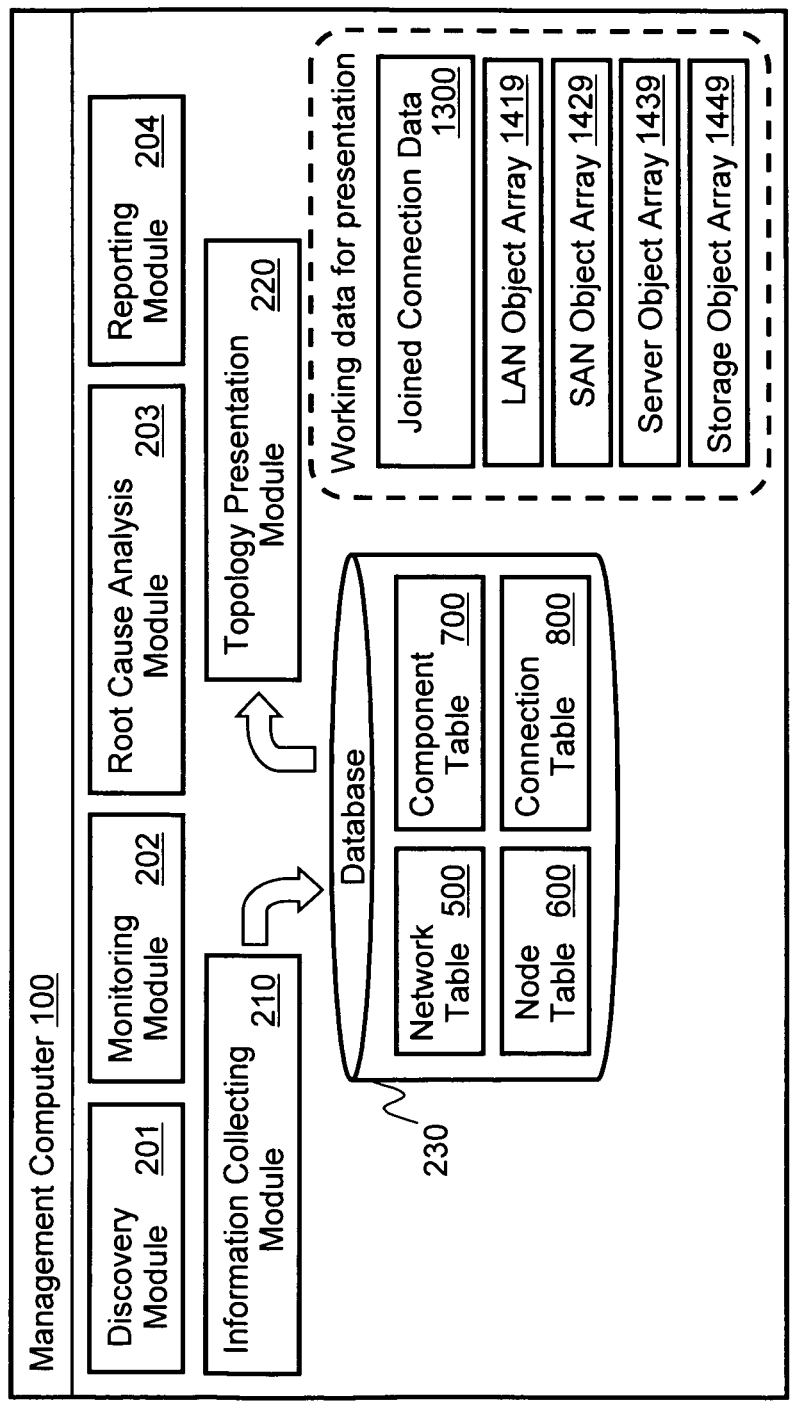
FIG. 2 Logical Element Structure on Management Computer

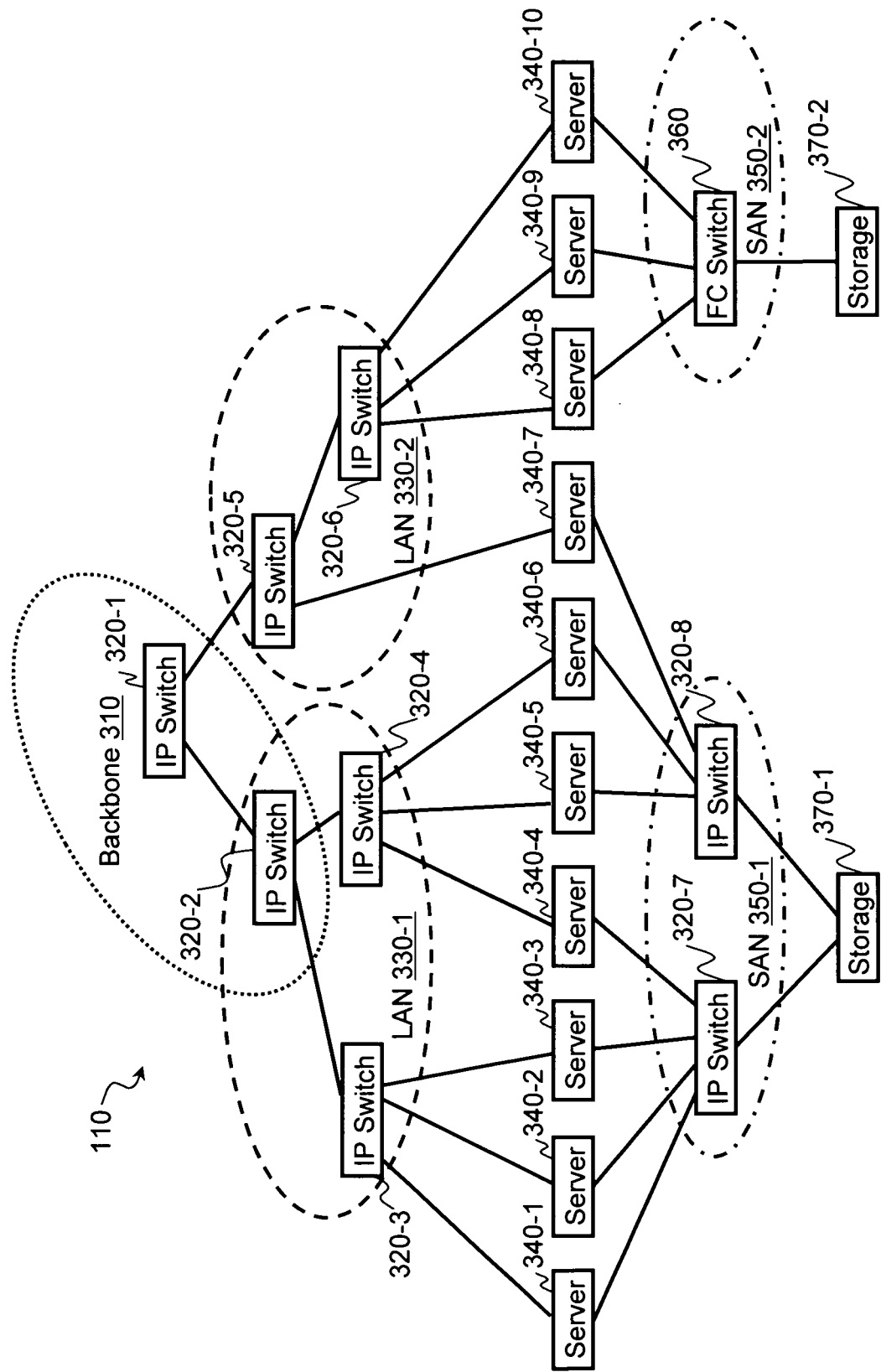
FIG. 3 Exemplary Layout of a Management Target System

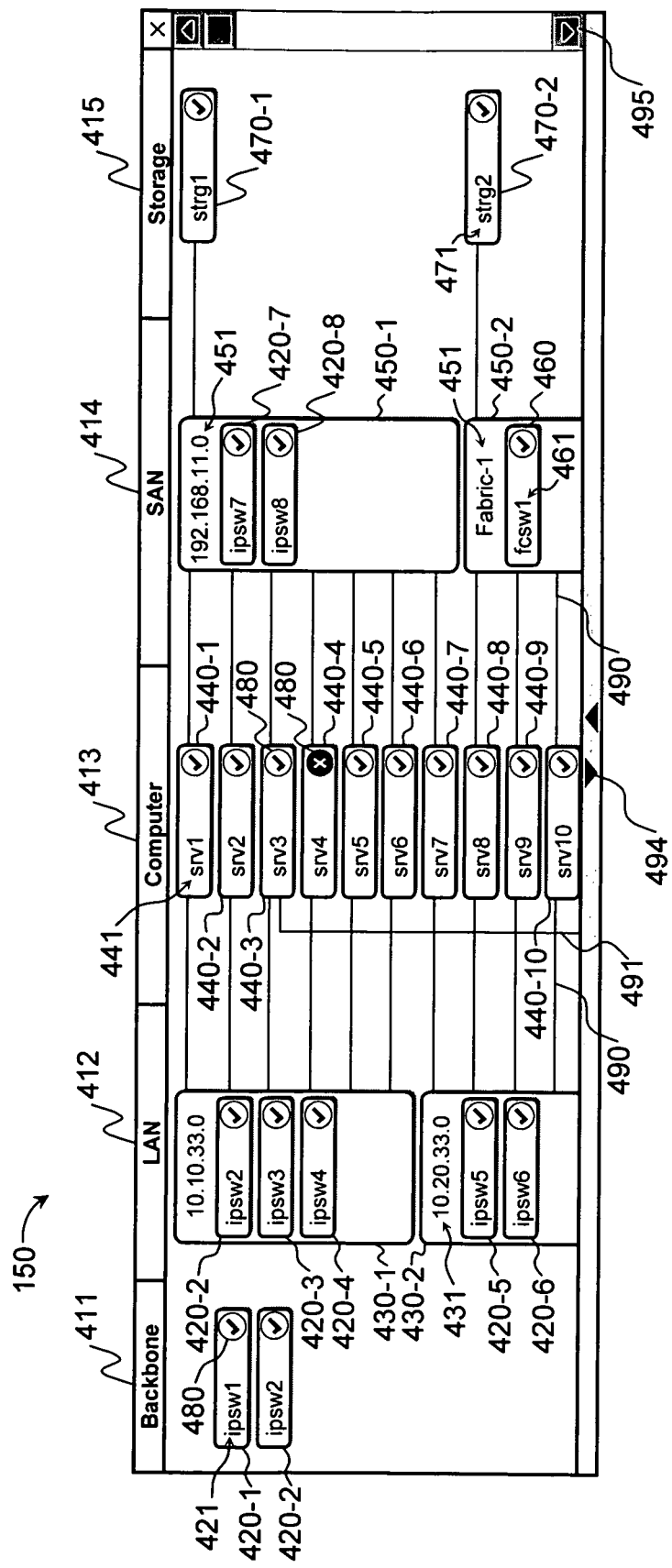
FIG. 4 User Interface with Topology Presentation (Topological List View)

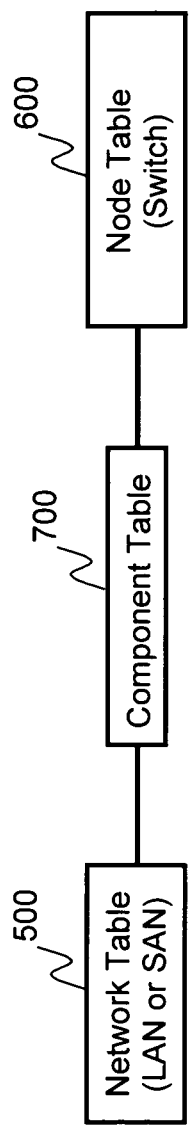
FIG. 5A Data Model and DB Table Relations for System Topology Network and Associated Switches Model
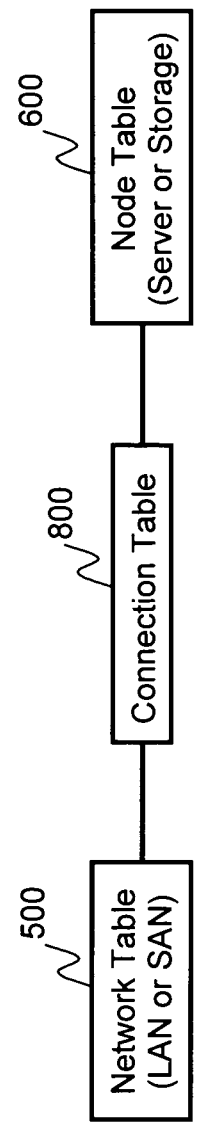
FIG. 5B Data Model and DB Table Relations for System Topology Network and Connected Server/Storage model

| ID ⤵510 | Name ⤵520 | Network Type ⤵530 | Display Type ⤵540 |
|---|---|---|---|
| Net1 | 10.10.33.0 | IP | LAN | ⤴591
| Net2 | 10.20.33.0 | IP | LAN | ⤴592
| Net3 | 192.168.11.0 | IP | SAN | ⤴593
| Net4 | Fabric-1 | FC | SAN | ⤴594
| ... | ... | ... | ... |

500

FIG. 6 Data Structure of Network Table

| ID | Name | Node Type |
|---|---|---|
| Node1 | ipsw1 | Switch |
| Node2 | srv1 | Server |
| Node3 | strg1 | Storage |
| ... | ... | ... |

FIG. 7 Data Structure of Node Table

| ID | Network ID | Node ID |
|---|---|---|
| Cmp1 | Net1 | Node1 |
| Cmp2 | Net1 | Node4 |
| Cmp3 | Net2 | Node10 |
| ... | ... | ... |

FIG. 8 Data Structure of Component Table

| ID | Network ID | Node ID | Connection Number |
|---|---|---|---|
| Cnct1 | Net1 | Node5 | 1 |
| Cnct2 | Net1 | Node6 | 2 |
| Cnct3 | Net2 | Node7 | 1 |
| ... | ... | ... | ... |

FIG. 9 Data Structure of Connection Table

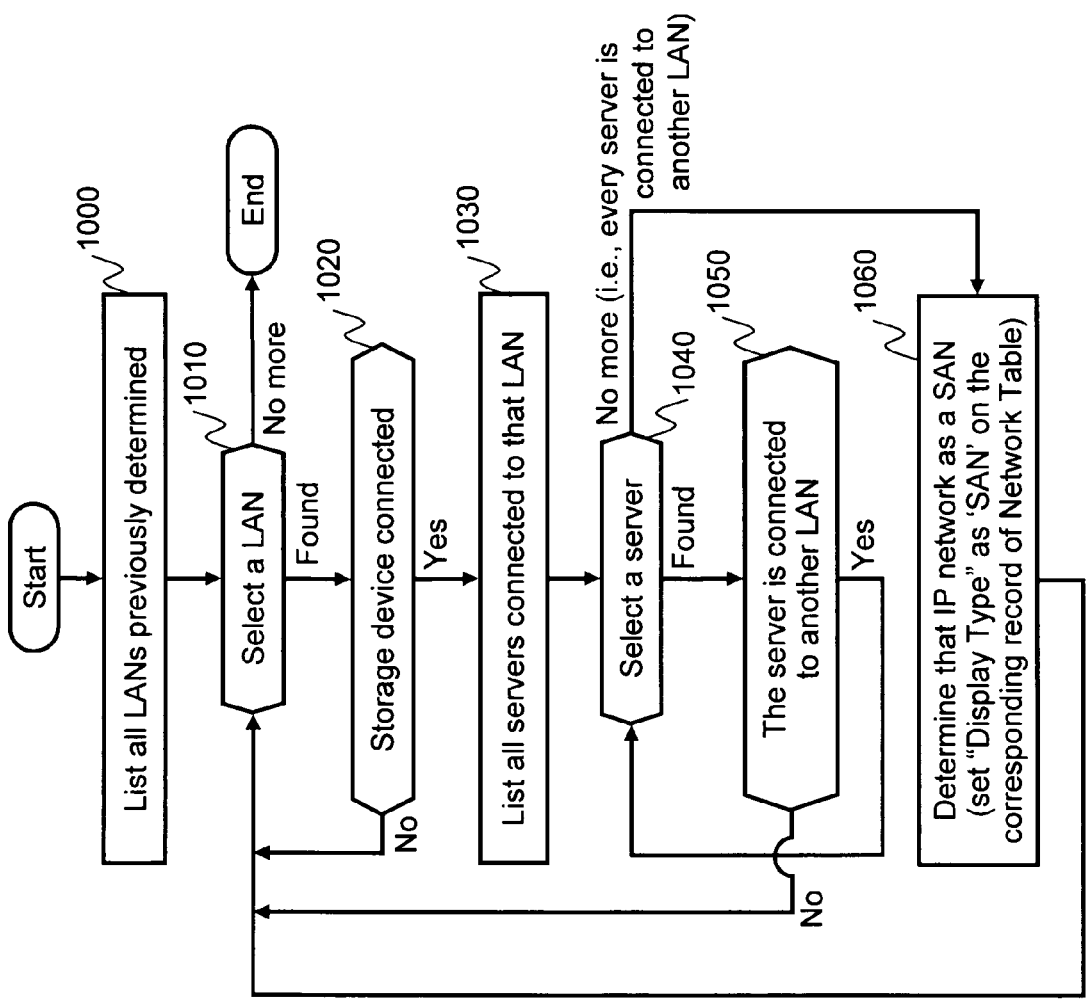
FIG. 10 Process of IP SAN Determination

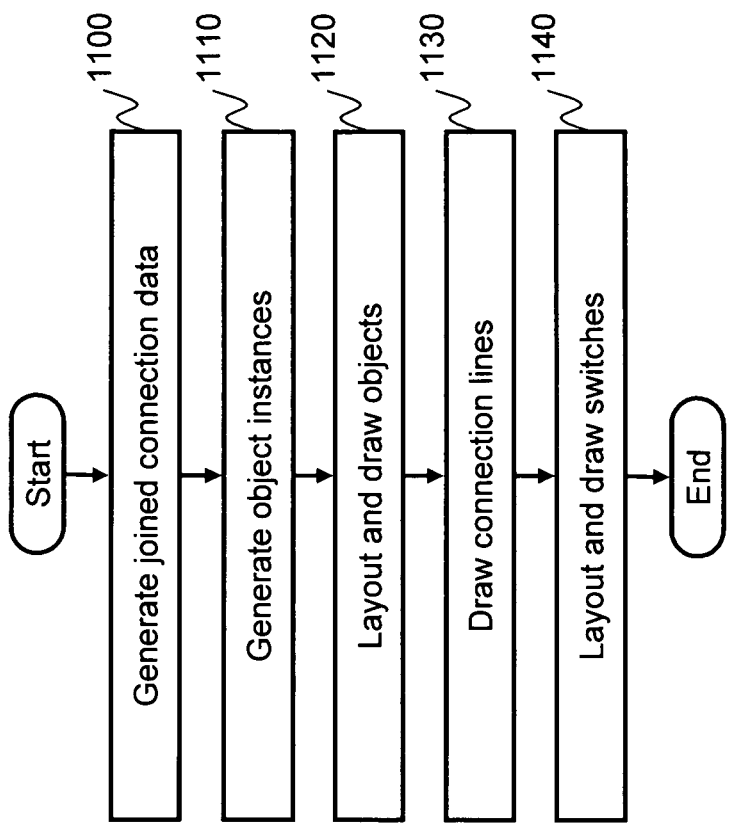
FIG. 11 Overall Process for Generating and Drawing a Topological List Display

| Type | LAN | Server | SAN | Storage |
|---|---|---|---|---|
| 1 | LAN | Server | SAN | Storage |
| 2 | (n/a) | Server | SAN | Storage |
| 3 | LAN | Server | SAN | (n/a) |
| 4 | LAN | Server | (n/a) | (n/a) |
| 5 | (n/a) | Server | SAN | (n/a) |
| 6 | (n/a) | (n/a) | SAN | Storage |
| 7 | LAN | Server | (n/a) | Storage |
| 8 | (n/a) | Server | (n/a) | Storage |

FIG. 12 Patterns of Topology Connections

| LAN | Server | SAN | Storage | |
|---|---|---|---|---|
| 10.10.33.0 | srv1 | 192.168.11.0 | strg1 | Type #1 — 1391 |
| 10.10.33.0 | srv2 | 192.168.11.0 | strg1 | |
| 10.20.33.0 | srv7 | 192.168.11.0 | strg1 | |
| 10.20.33.0 | srv8 | Fabric-1 | strg2 | Type #4 — 1392 |
| 10.20.33.0 | srv20 | NULL | NULL | |
| 10.20.33.0 | srv21 | NULL | NULL | Type #7 — 1393 |
| 10.20.33.0 | NULL | NULL | NULL | |
| 10.40.33.0 | NULL | NULL | strg3 | Type #2 — 1394 |
| 10.40.33.0 | srv30 | Fabric-3 | strg4 | |
| NULL | srv31 | Fabric-3 | strg7 | |
| NULL | NULL | Fabric-5 | strg7 | |
| NULL | NULL | Fabric-5 | strg10 | Type #6 — 1395 |
| NULL | NULL | Fabric-5 | strg11 | |
| ... | ... | ... | ... | |

1300

1310  1320  1330  1340

FIG. 13 Generated and Joined Connection Data

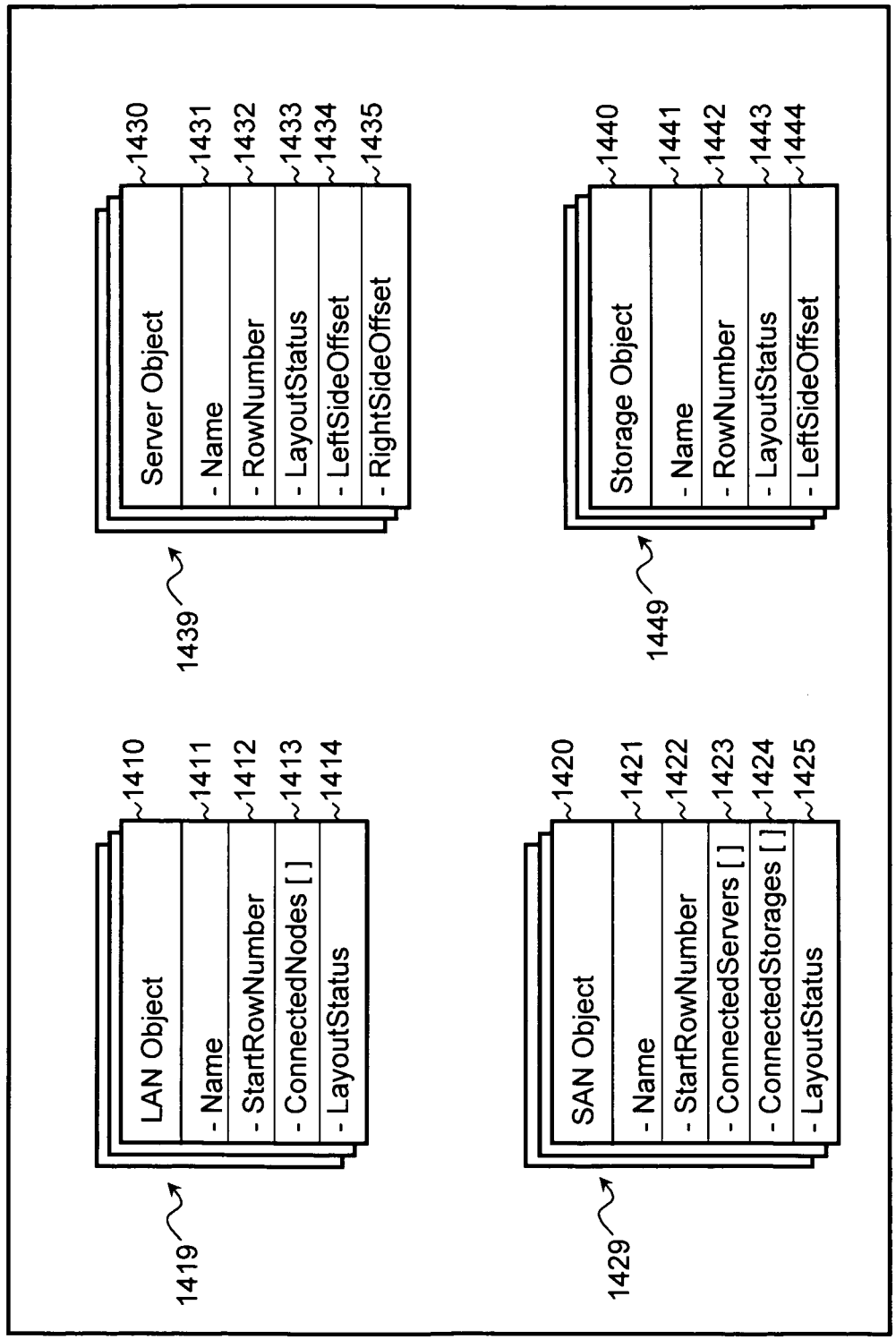
FIG. 14 Data Structures of Network and Node Objects

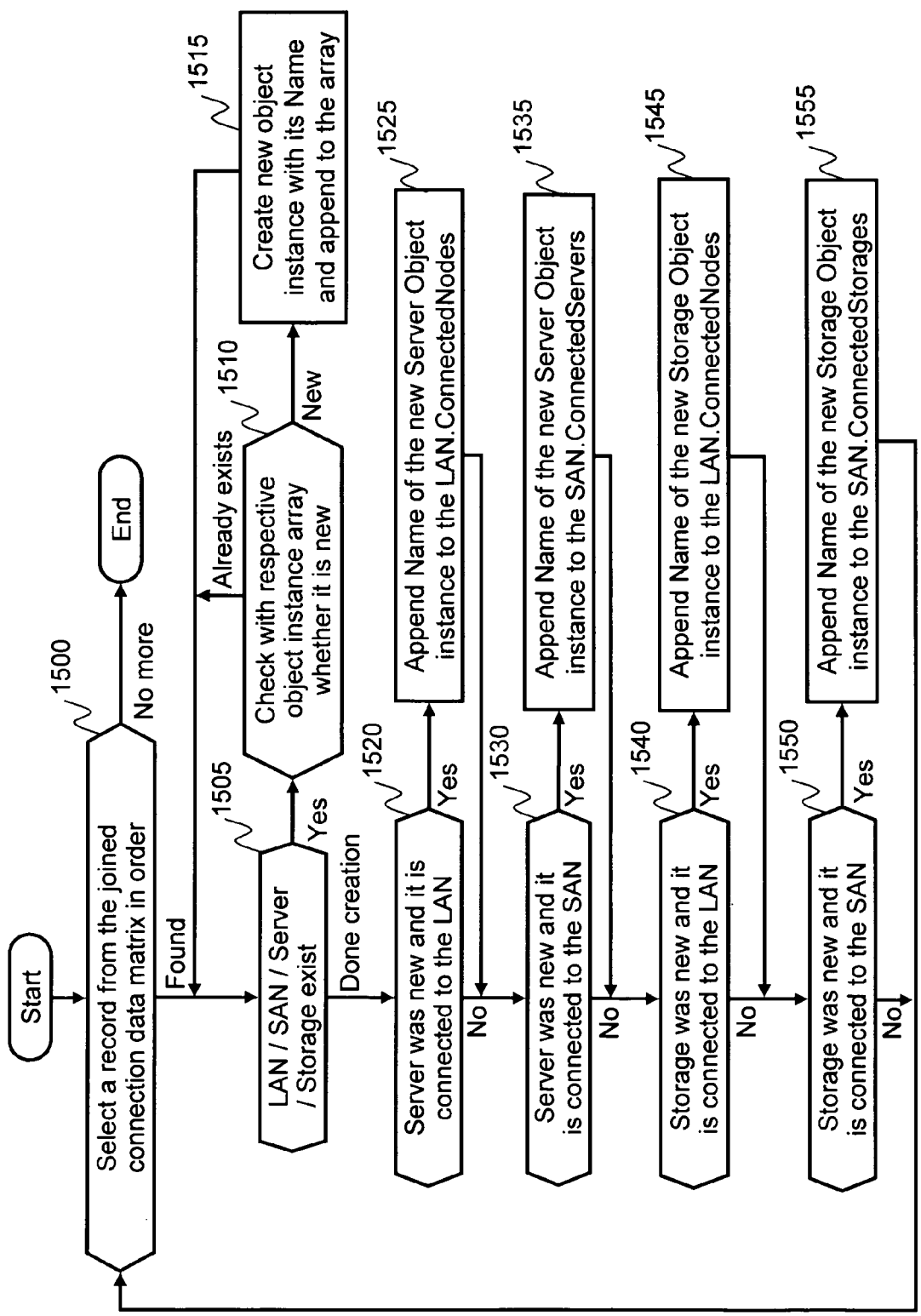
FIG. 15 Process of Object Instance Generation

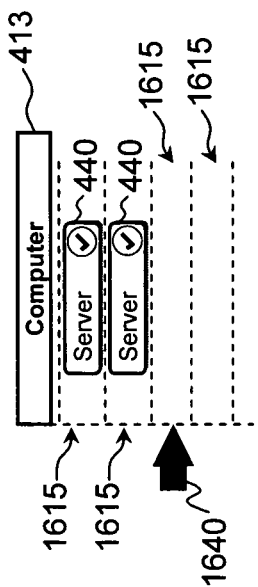
FIG. 16A Basics of Laying Out of Objects
(a) Row Position
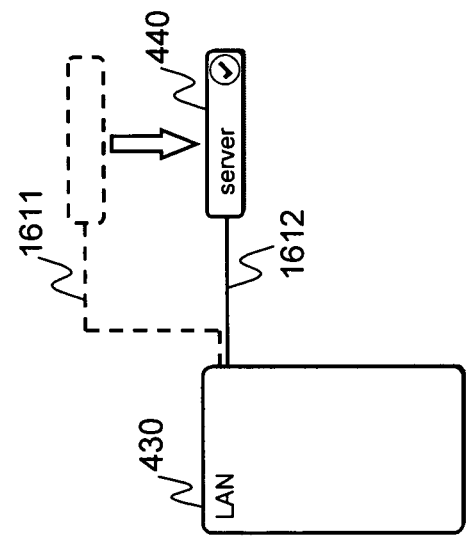
FIG. 16B Basics of Laying Out of Objects
(b) Layout Optimization

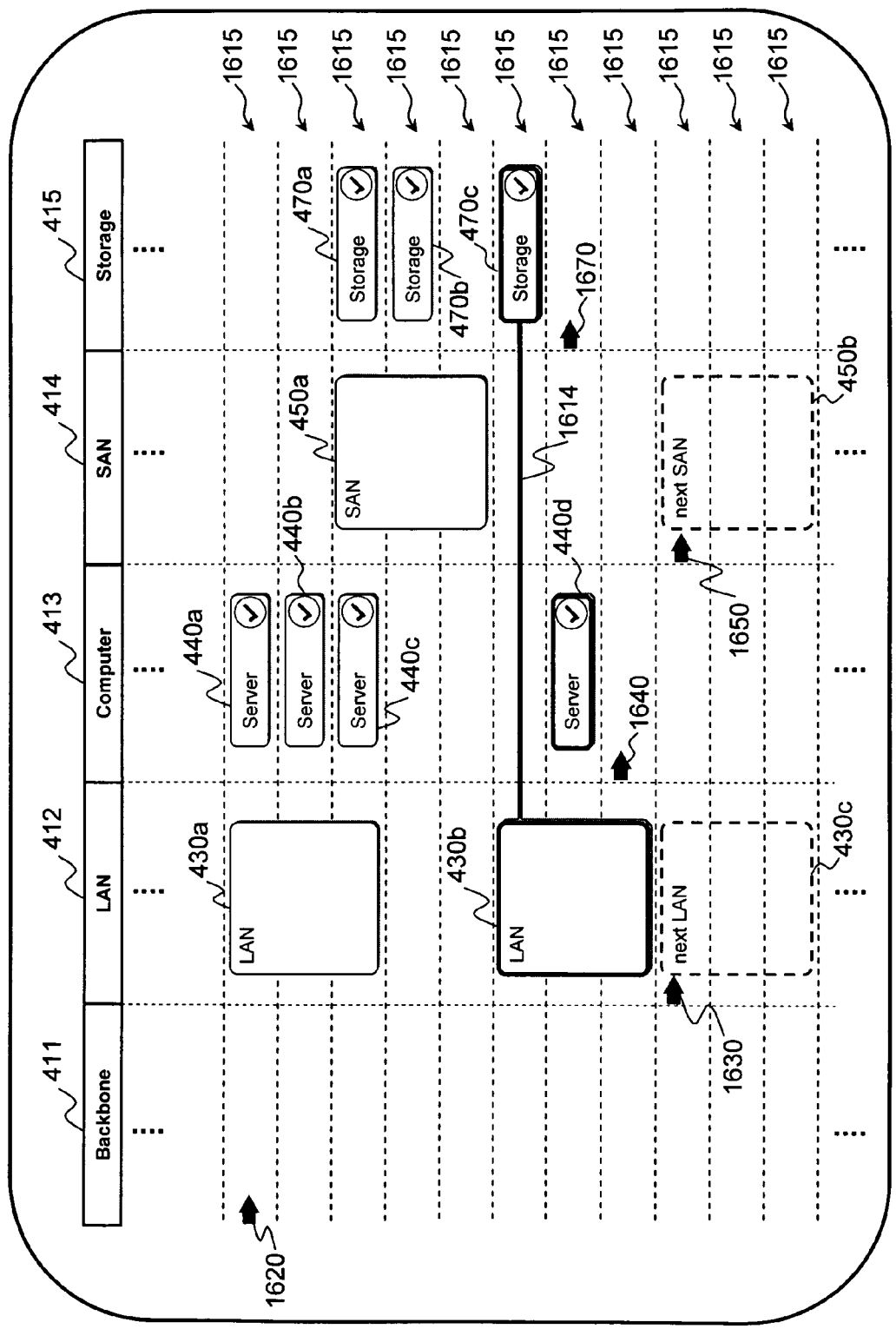
FIG. 16C Basics of Laying Out of Objects
(c) LAN=Storage Connection Type Layout

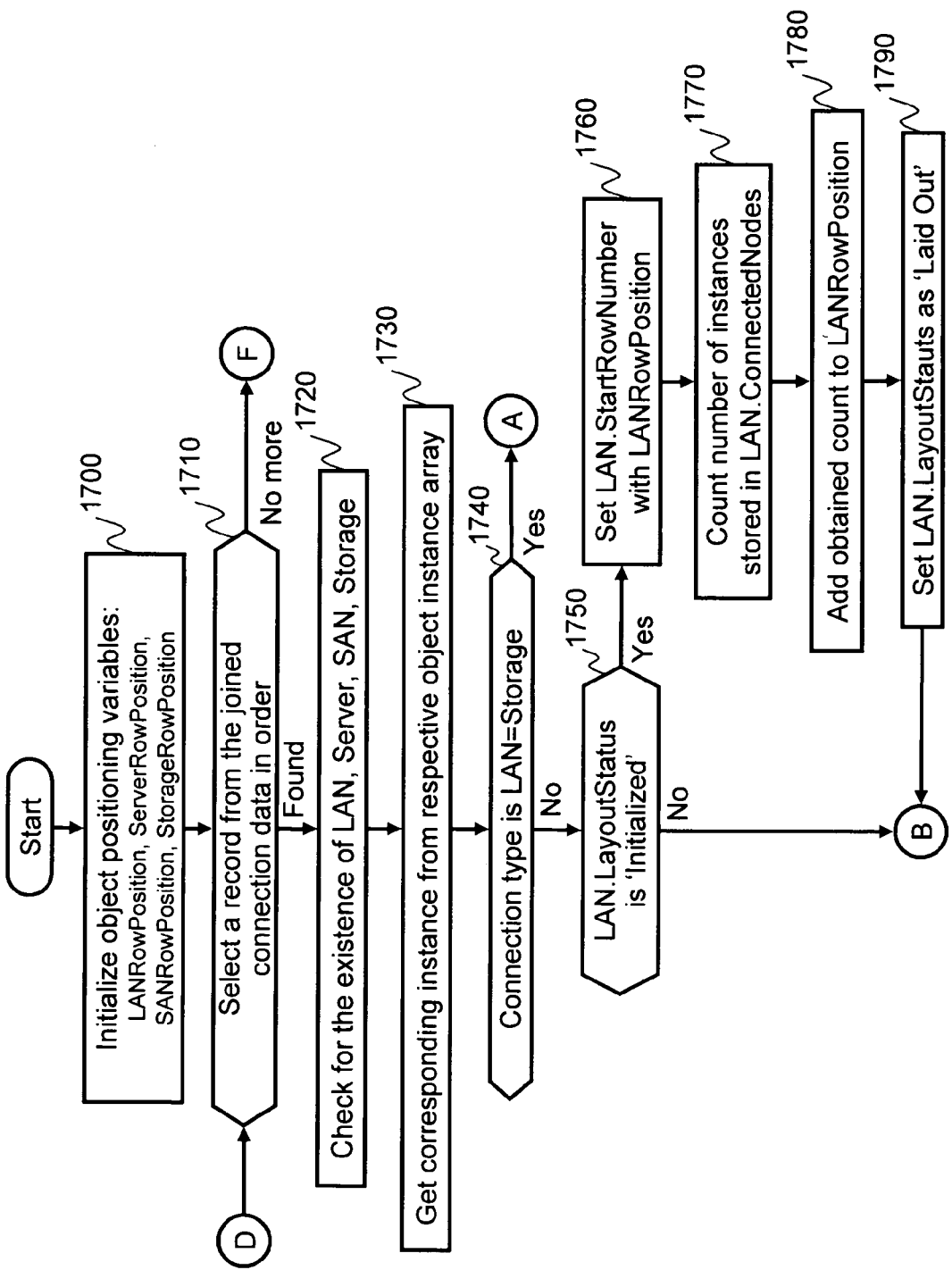
FIG. 17A Process of Object Layout (a)

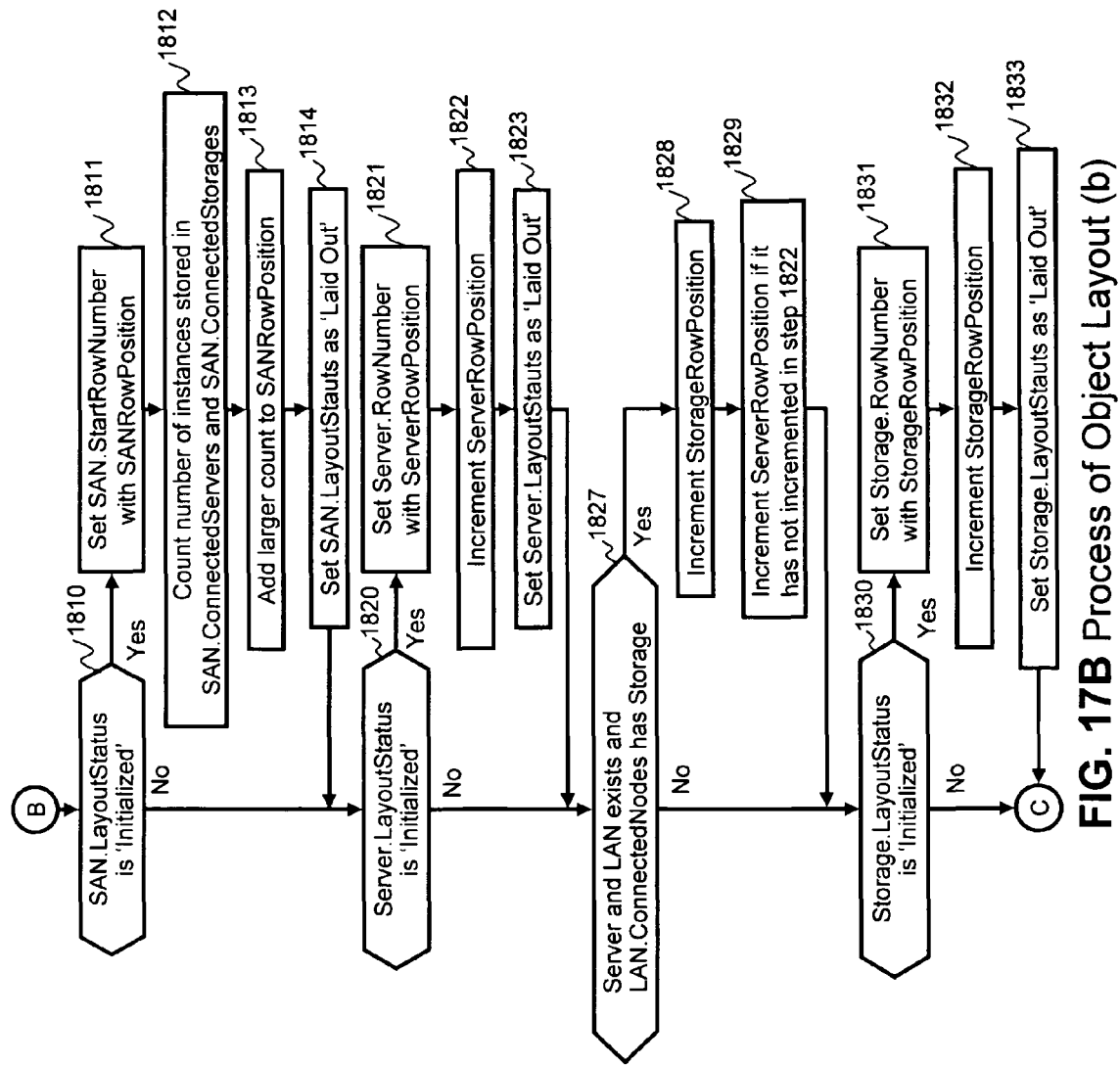
FIG. 17B Process of Object Layout (b)

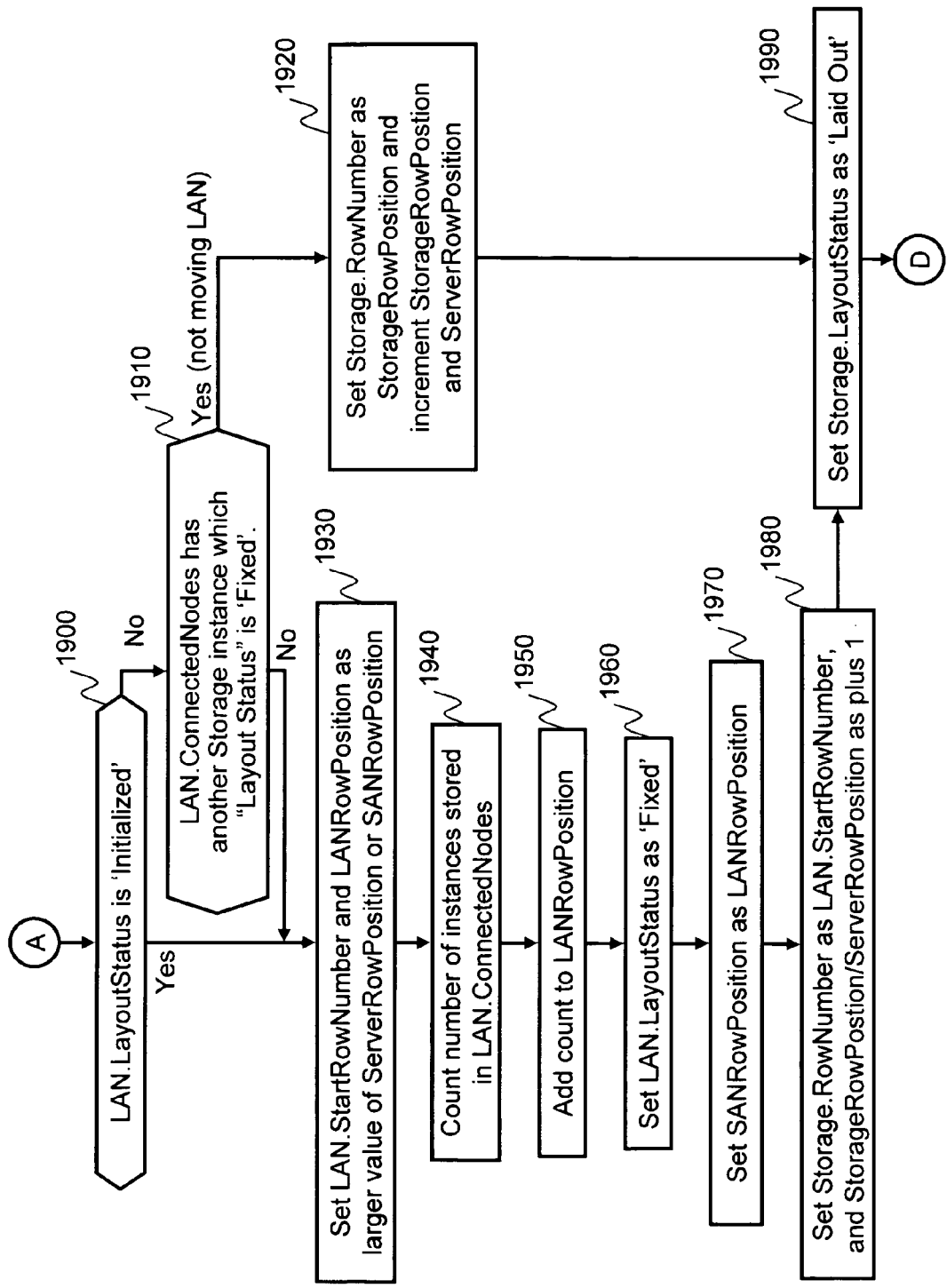
FIG. 17C Process of Object Layout - (c) LAN=Storage Connection Layout

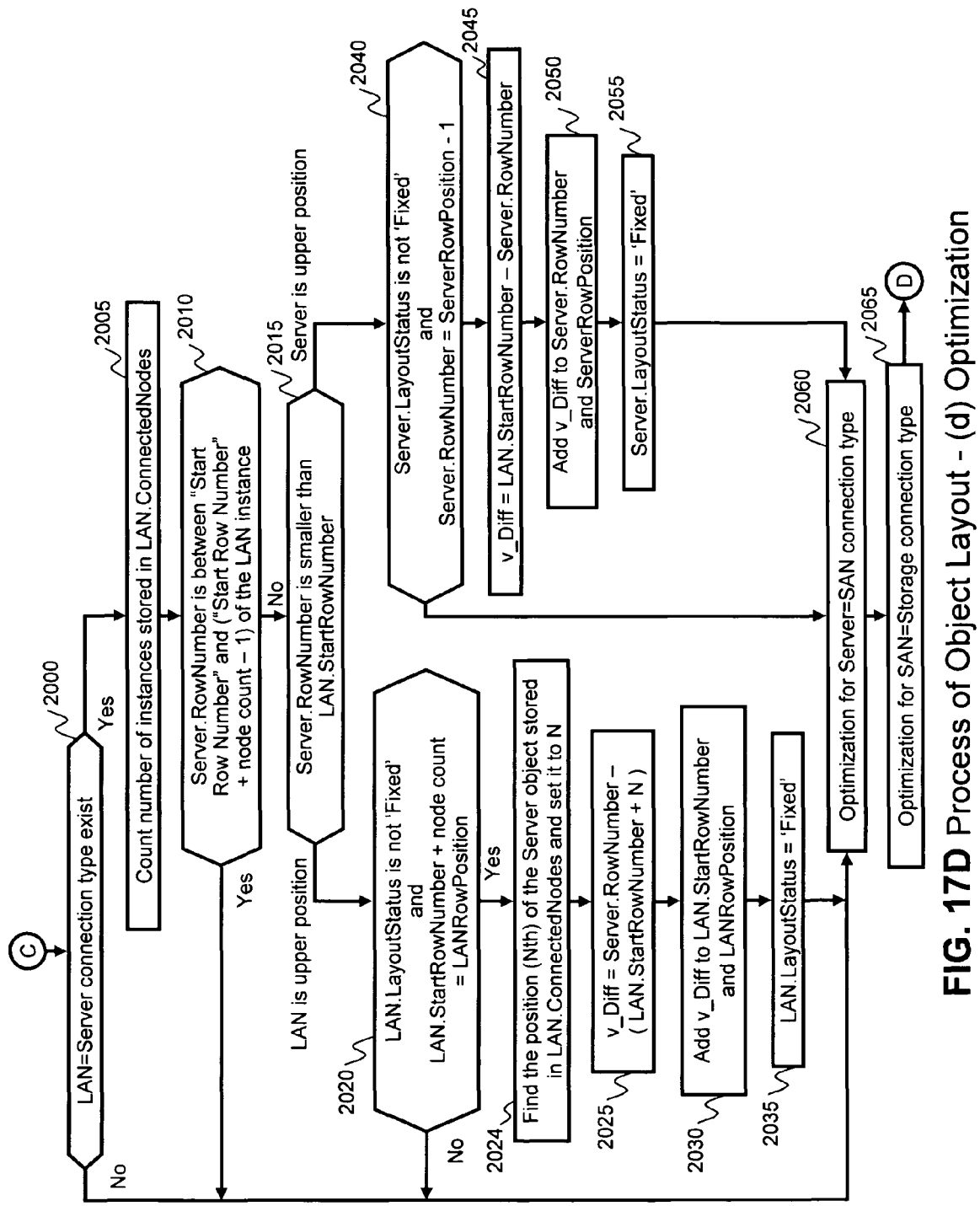
FIG. 17D Process of Object Layout - (d) Optimization

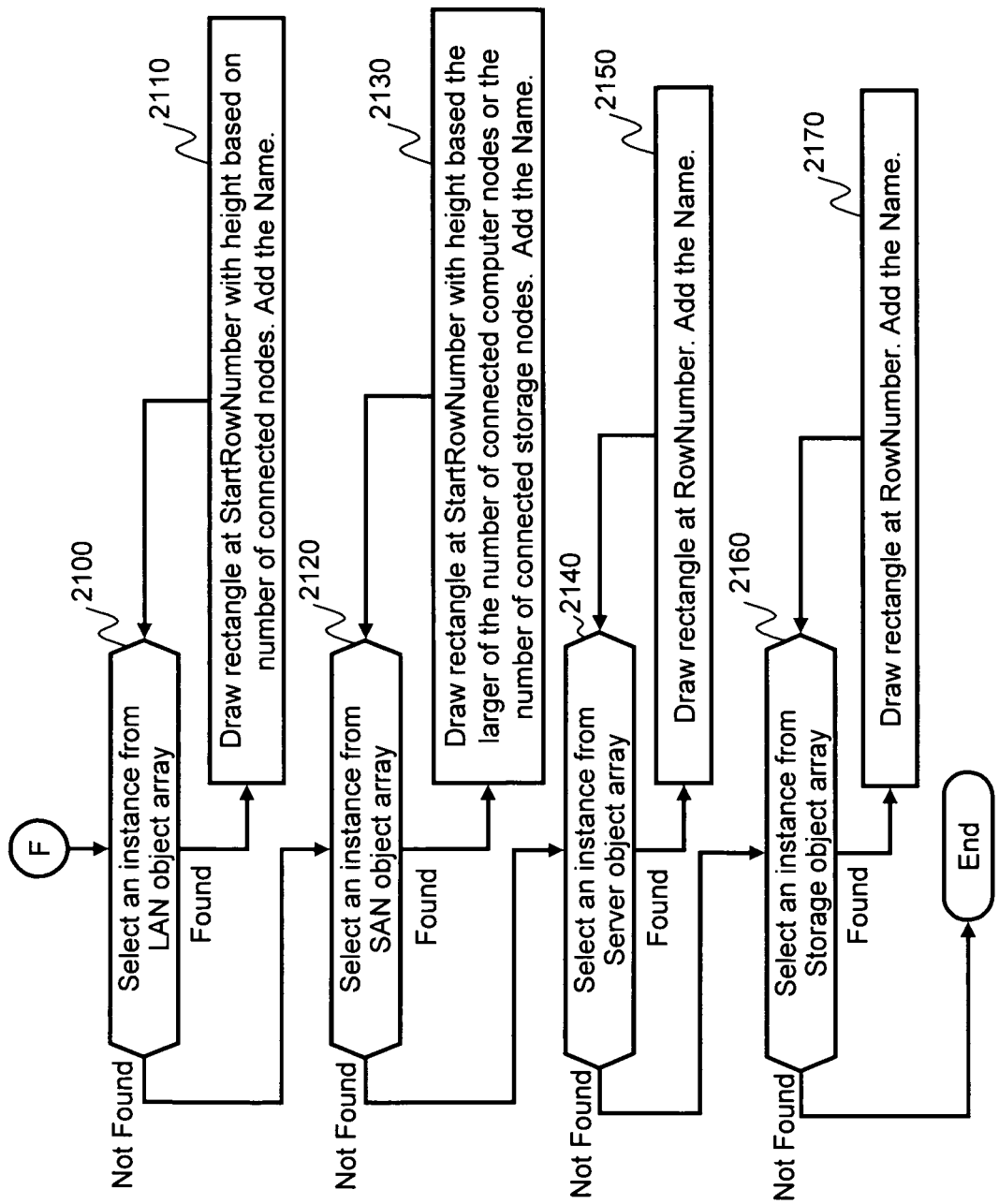
FIG. 17E Process of Object Layout - (e) Object Drawing

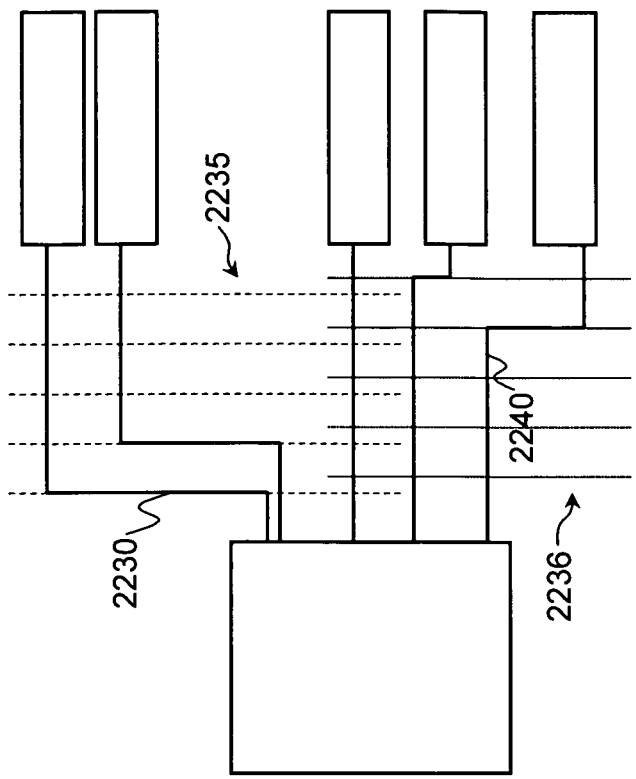
FIG. 18C Basics of Drawing Connection Lines
(c) Upper and Lower Direction Grids
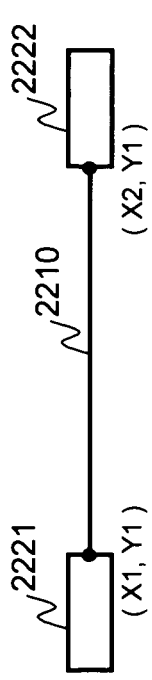
FIG. 18A Basics of Drawing Connection Lines
(a) Coordinates – Straight Line
FIG. 18B Basics of Drawing Connection Lines
(b) Coordinates – Stepped Line

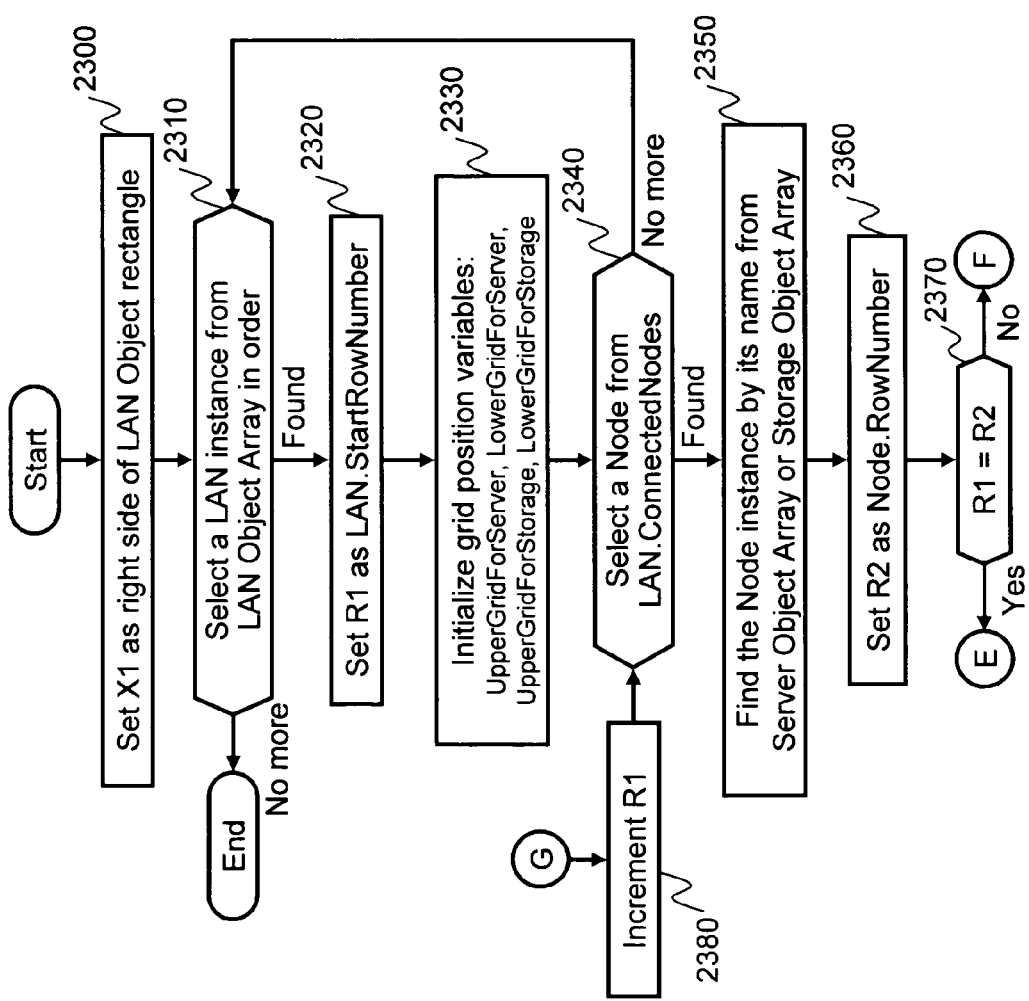
FIG. 19A Process of Connection Line Drawing – LAN=Server/Storage

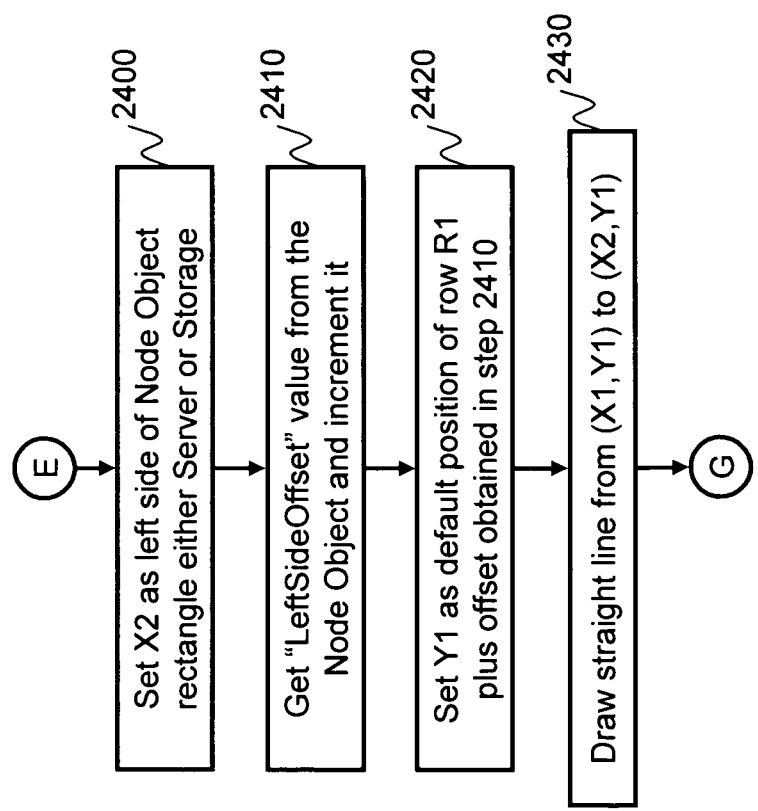
FIG. 19B Process of Connection Line Drawing – LAN=Server/Storage

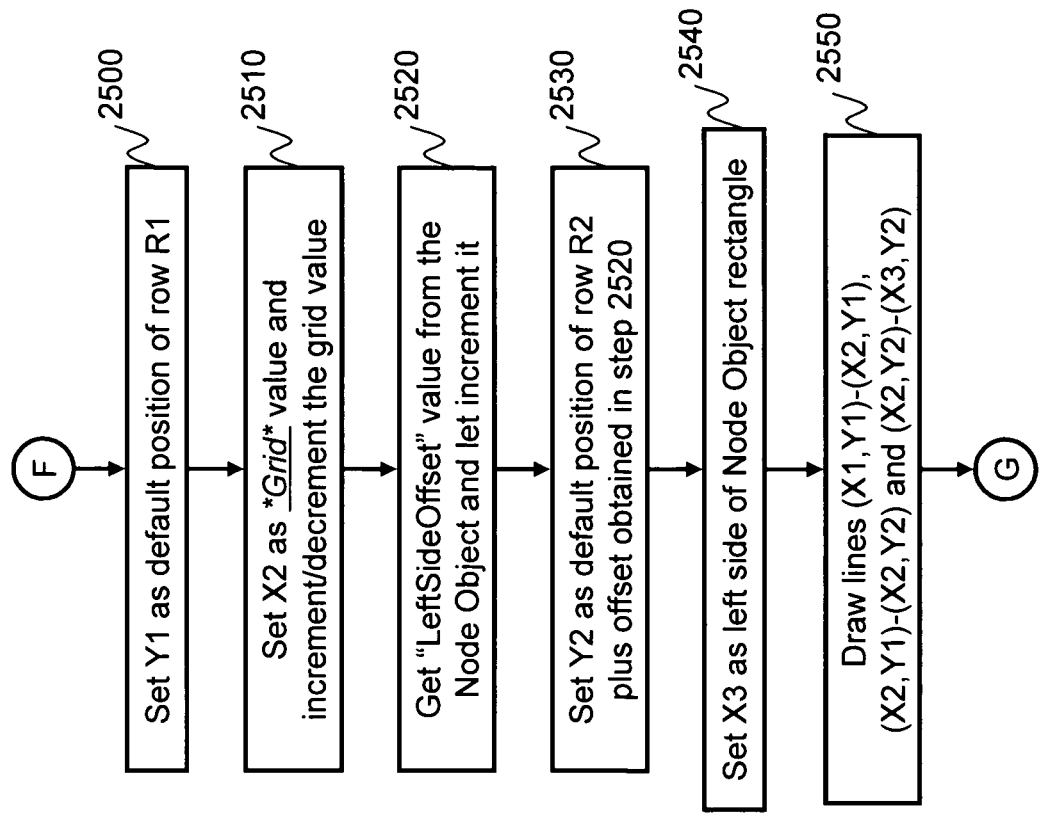
FIG. 19C Process of Connection Line Drawing – LAN=Server/Storage

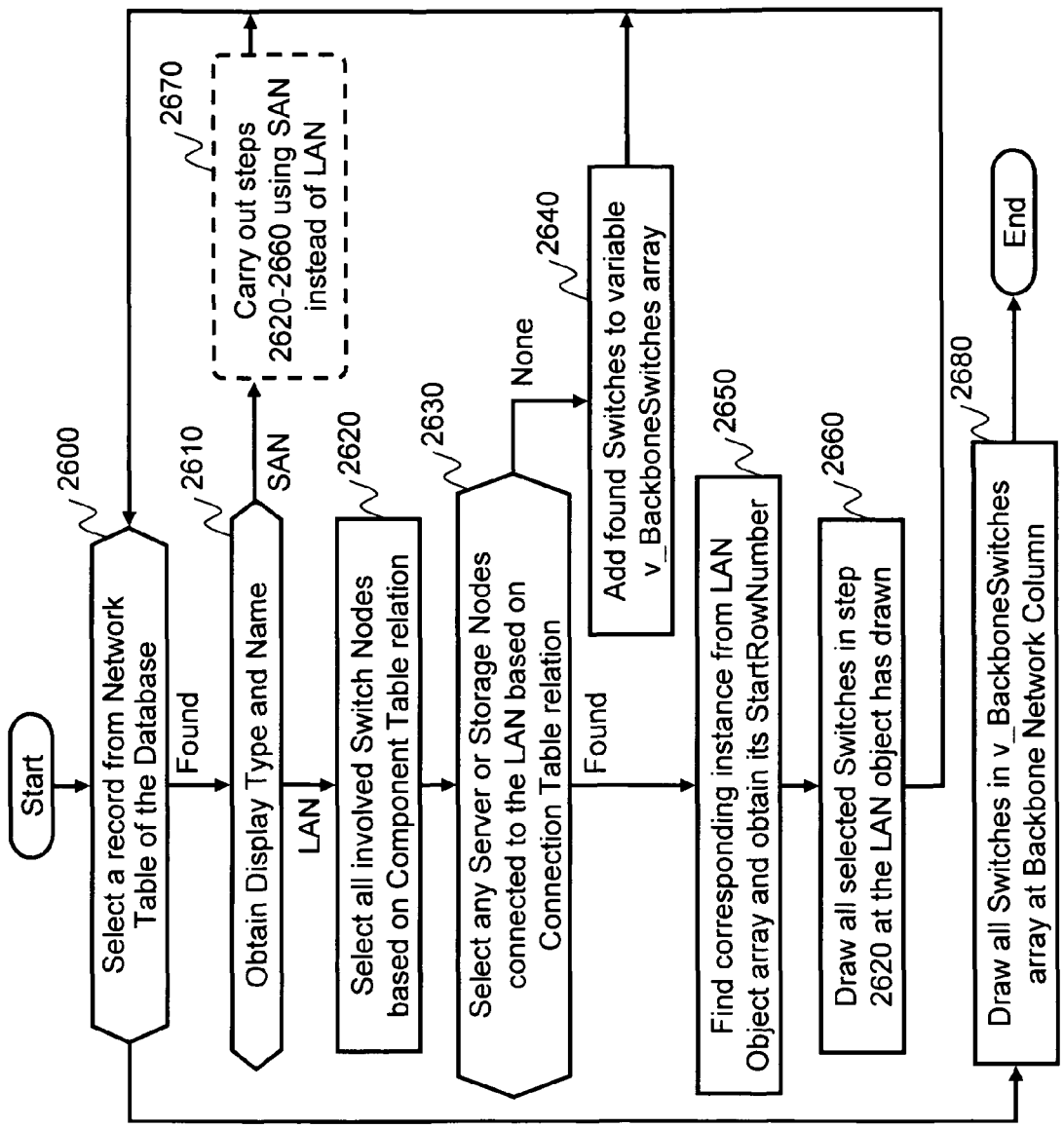
FIG. 20 Process of Laying Out and Drawing Switches

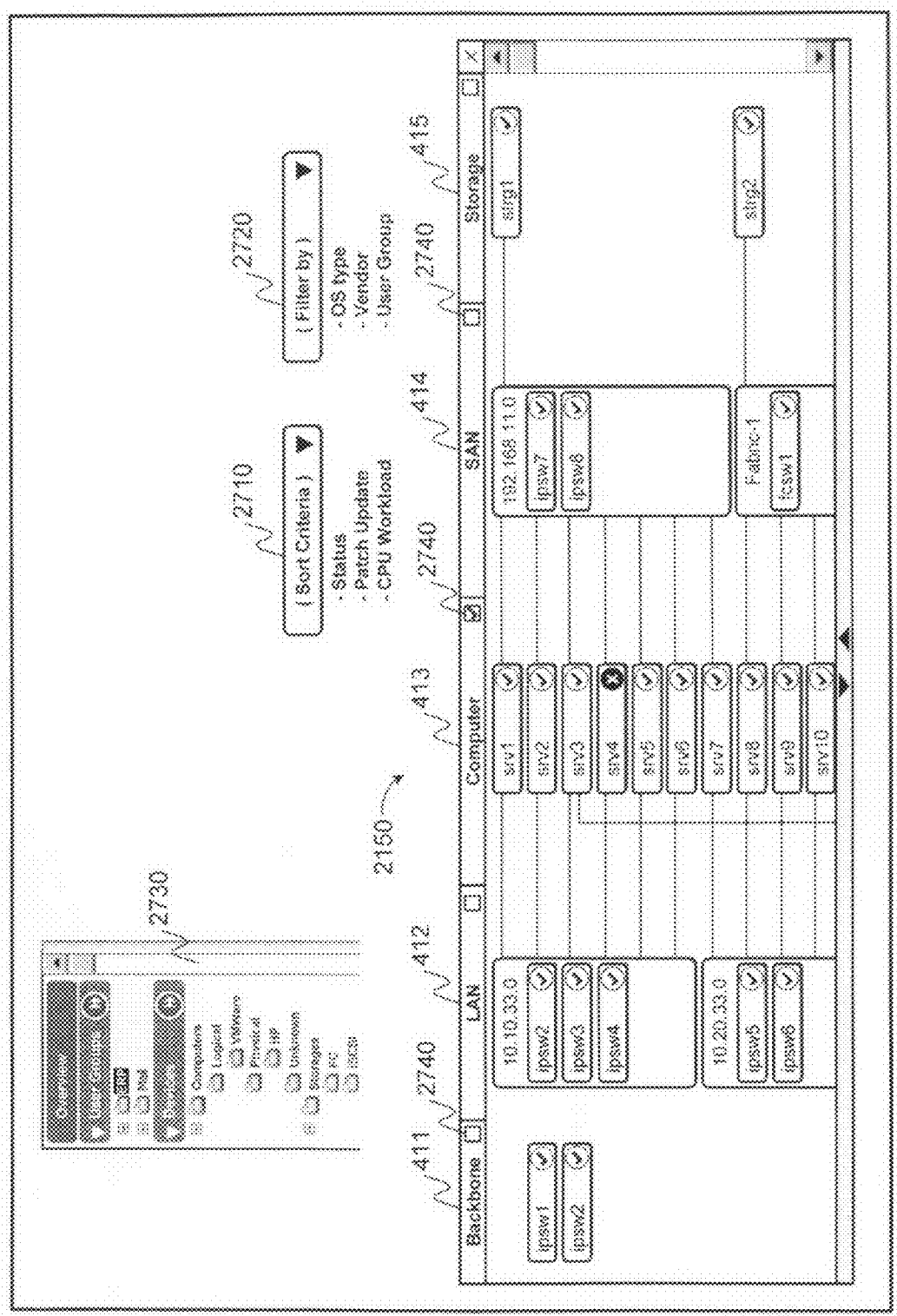
FIG. 21 User Interface with Topology Presentation and Sorting/Filtering

| LAN | LAN Status | Server | Server Status | SAN | SAN Status | Storage | Storage Status |
|---|---|---|---|---|---|---|---|
| NULL | NULL | srv30 | Critical | Fabric-3 | Warning | strg7 | OK |
| 10.10.33.0 | OK | srv4 | Critical | 192.168.11.0 | OK | strg1 | OK |
| 10.10.33.0 | OK | srv12 | Warning | 192.168.11.0 | OK | strg1 | OK |
| 10.20.33.0 | OK | srv7 | OK | Fabric-1 | OK | strg2 | Warning |
| 10.20.33.0 | OK | srv8 | OK | NULL | NULL | NULL | NULL |
| 10.20.33.0 | OK | srv20 | OK | NULL | NULL | NULL | NULL |
| 10.20.33.0 | OK | srv21 | OK | Fabric-3 | Warning | strg7 | OK |
| NULL | NULL | srv31 | OK | NULL | NULL | strg3 | OK |
| 10.40.33.0 | Critical | NULL | NULL | NULL | NULL | strg4 | OK |
| 10.40.33.0 | Critical | NULL | NULL | Fabric-5 | OK | strg10 | OK |
| NULL | NULL | NULL | NULL | Fabric-5 | OK | strg11 | OK |
| ... | ... | ... | ... | ... | ... | ... | ... |

FIG. 22 Generated and Joined Connection Data with Status Indication

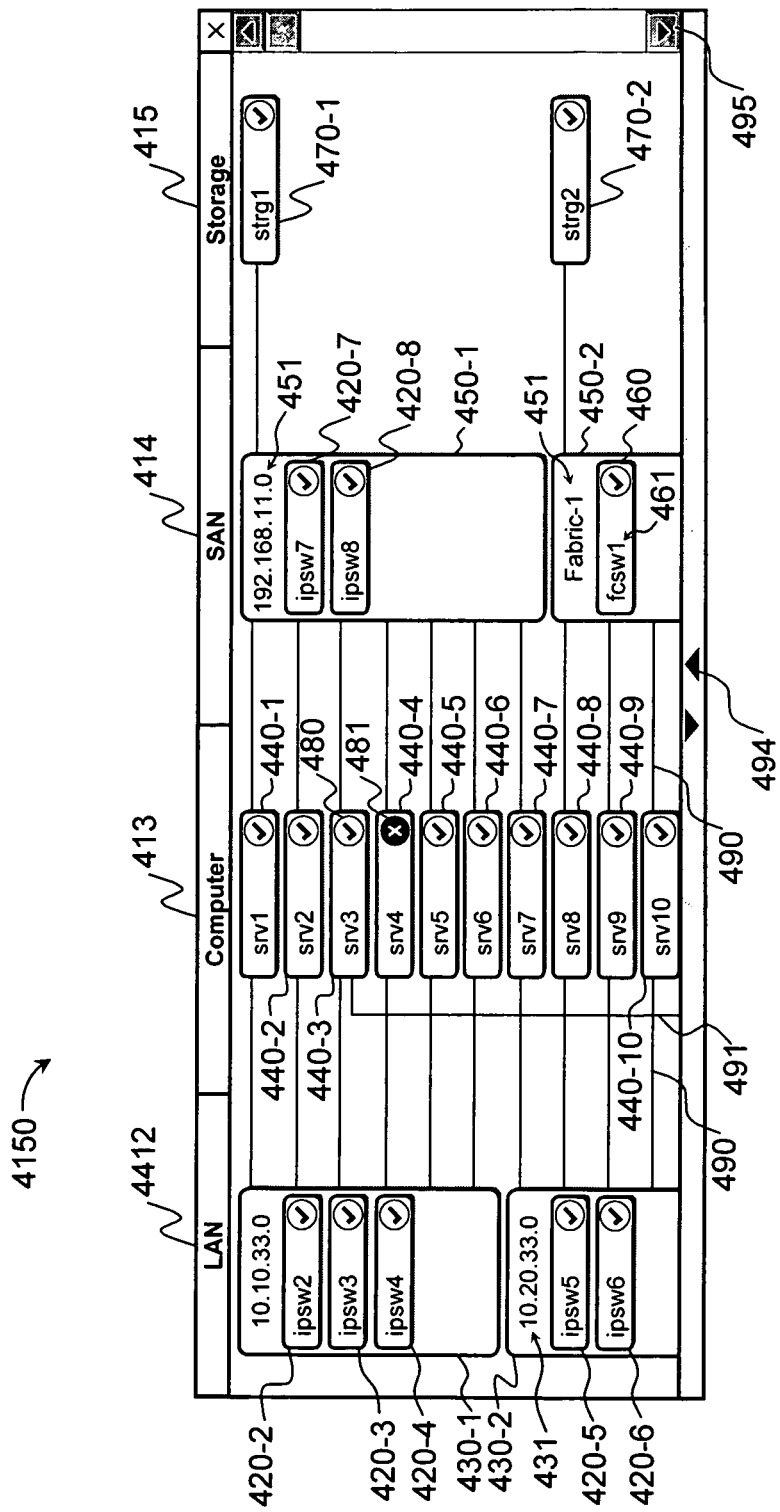
FIG. 23 Alternative Embodiment of a User Interface providing Topology Presentation

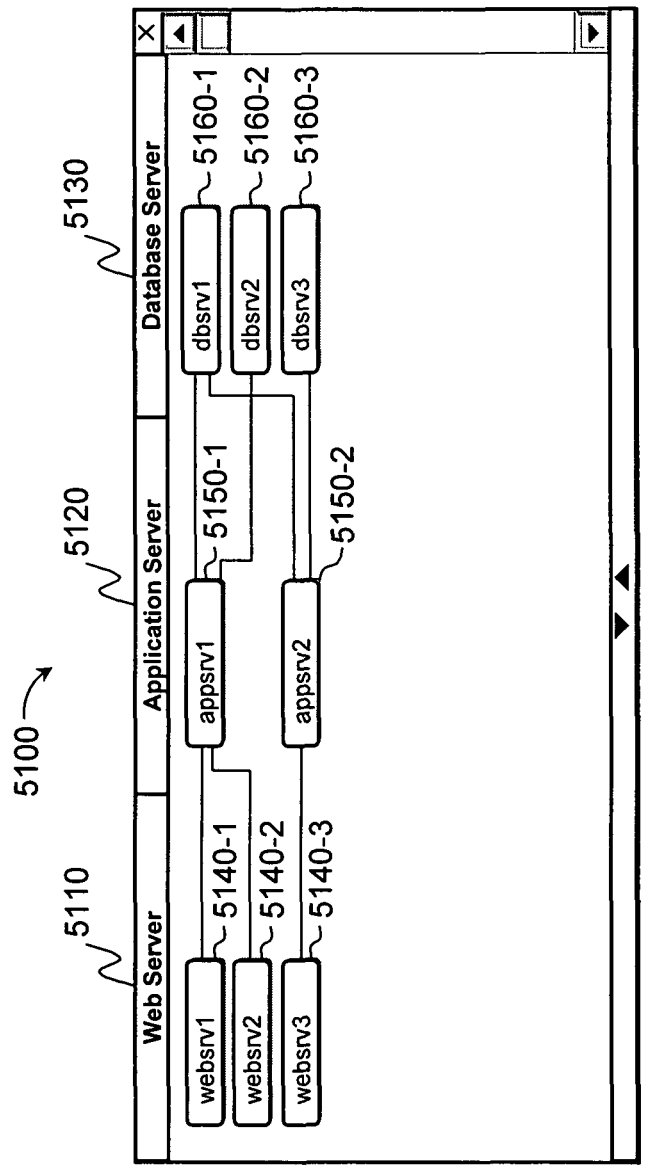
FIG. 24A Alternative Embodiment of a User Interface providing Topology Presentation including Logical Components – "Web Three-Tiered System"

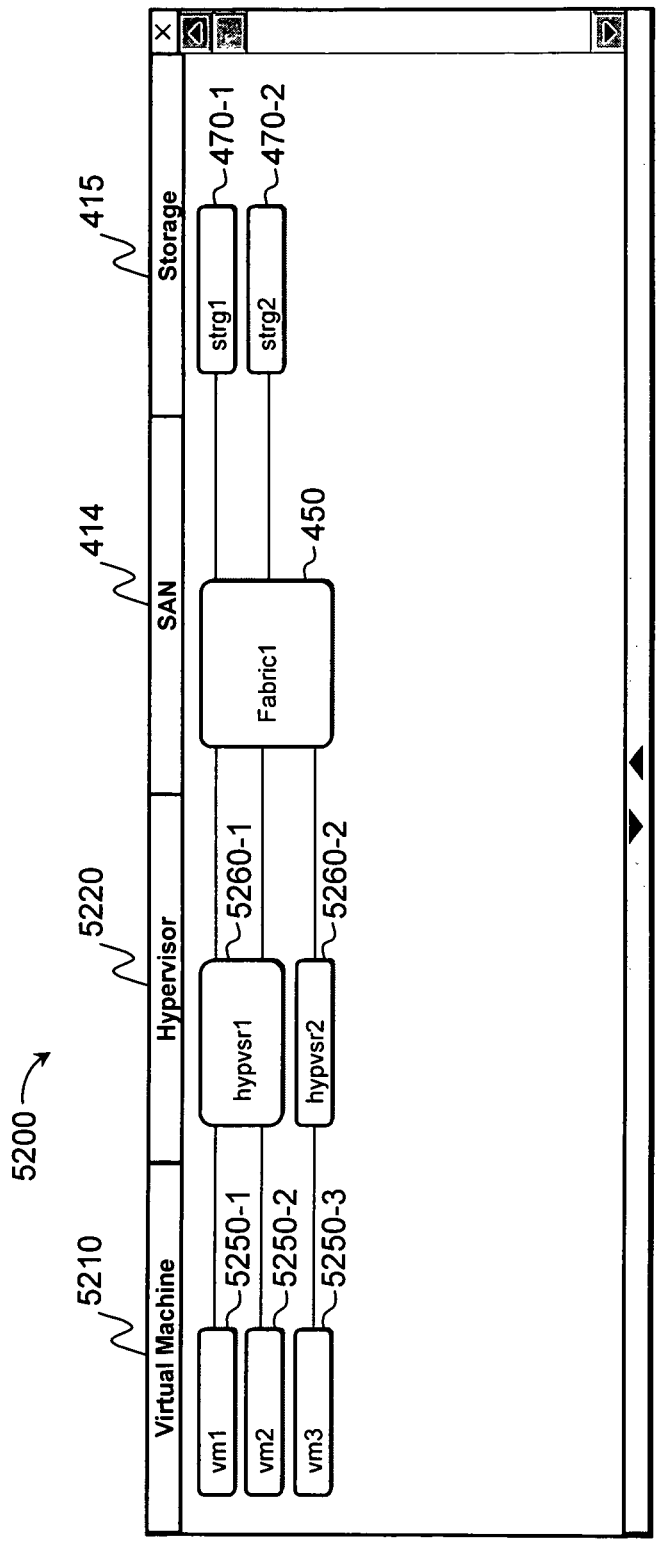
FIG. 24B Alternative Embodiment of a User Interface providing Topology Presentation including Logical Components – "Virtual Machine with SAN in a System"

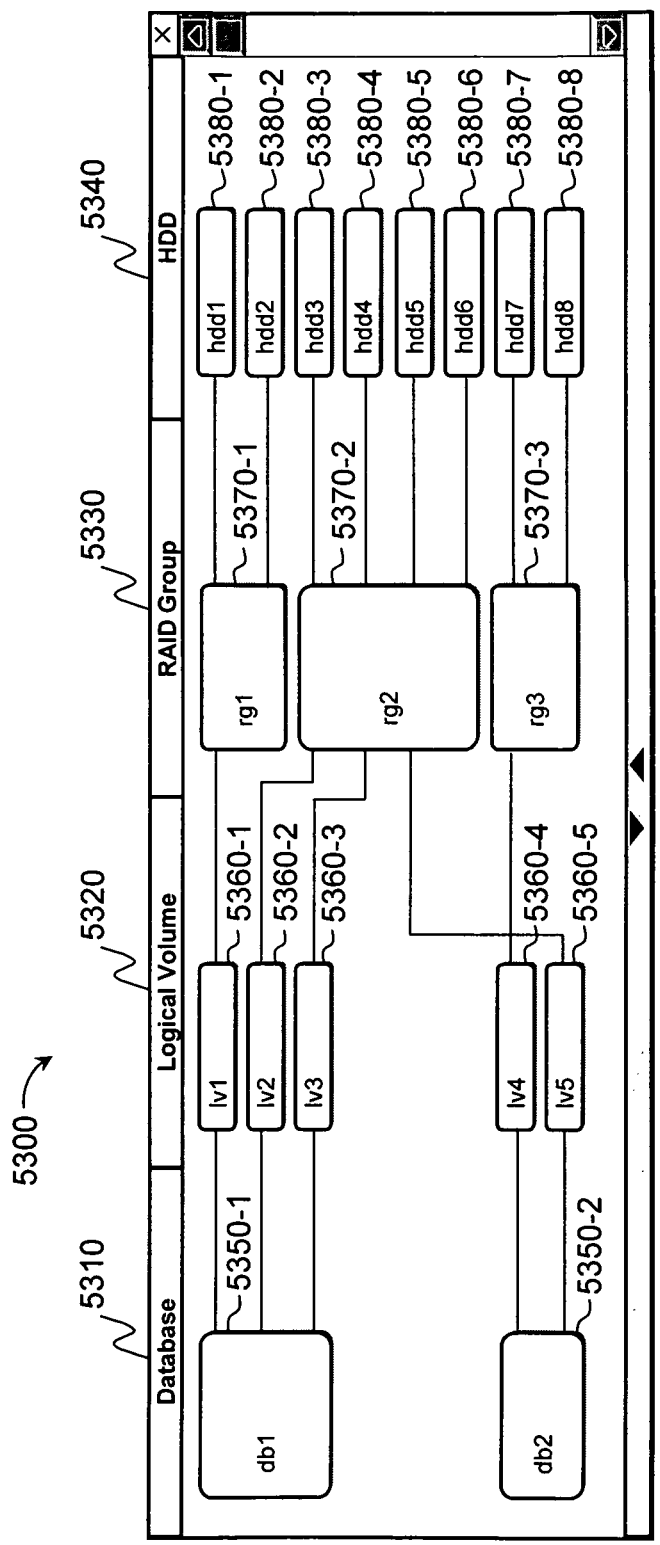
FIG. 24C Alternative Embodiment of a User Interface providing Topology Presentation including Logical Components – "Database and Logical Volume Manager in a System"

USER INTERFACE PROVIDING INFORMATION SYSTEM TOPOLOGY PRESENTATION

BACKGROUND OF THE INVENTION

According to recent trends, information technology (IT) systems of companies are becoming ever more large and complex. For example, in some businesses, the IT system is no longer just an infrastructure of the business, but needs to act in partnership with the business to increase the value and competitiveness of the business. Furthermore, the rapid growth of IT systems is not limited to very large companies, but even mid-sized companies can now have hundreds of servers. The rapid growth of server virtualization technology is causing an acceleration of this trend.

Despite the recent trends of massive growth in data centers and other IT systems, the administrators of IT organizations are still required to efficiently manage these large and complex IT systems to keep them running properly. When a problem occurs, the administrators need to recognize that there is a problem, analyze the problem and then resolve the issue as soon as possible.

Typically, monitoring the health of an IT system and analyzing any problems that may arise is carried out using some form of availability and performance management software. This software usually includes the ability to discover devices in the IT system and identify their connections. This software can be operated remotely from the IT system that is the object or target of the management (i.e., the IT system to be managed may be referred to as the "management target system"), and can often display the devices discovered in the system on a display screen in a graphic or other manner of topological view, thereby providing an indication or report on the status of the respective devices, and possibly also automatically analyzing the cause of any problems.

Through use of such management software, administrators are relieved from a number of tedious operation tasks that they used to have to perform manually. However, as mentioned above, IT systems themselves are growing rapidly, while IT budgets are typically becoming more restricted. This has resulted in each administrator being responsible for managing a very large area of the IT system. Thus, there is a gap emerging between manageability provided by the current management software and the size of the systems that are required to be managed. In particular, the topological views provided by currently-available software for system monitoring or problem analyzing have become too complicated and are able to display only a small portion of the IT systems on a display screen at any one time. Since the topology of the entire system is information necessary for an administrator to properly carry out system management for managing availability and performance of the information system, there is no currently available solution for use with large and expandable IT systems.

Related art includes U.S. Pat. No. 7,249,347, to Chang et al.; US Pat. App. Pub. 2007/0094597 to Rostom; US Pat. App. Pub. 2007/0204231 to Cunningham et al.; and US Pat. App. Pub. 2007/0156861 to Nedelcu et al., the entire disclosures of which are incorporated herein by reference.

BRIEF SUMMARY OF THE INVENTION

Exemplary embodiments of the invention provide a user interface to improve the efficiency of information system availability and improve the performance of management tasks such as monitoring of system conditions and analysis of problems within the system. Exemplary embodiments of the user interface of the invention provide superior density of displayed end-to-end topology of information systems by displaying components of the information systems in a graphical topological list view. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 1 illustrates an example of a hardware configuration in which the method, system and programs of the invention may be applied.

FIG. 2 illustrates an example of a logical configuration of the invention applied to the configuration of FIG. 1.

FIG. 3 illustrates an example of an information system as a management target.

FIG. 4 illustrates an exemplary user interface of the invention with topology presentation.

FIGS. 5A-5B illustrate exemplary data models and database relations for system topology.

FIG. 6 illustrates an exemplary data structure of a network table.

FIG. 7 illustrates an exemplary data structure of a node table.

FIG. 8 illustrates an exemplary data structure of a component table.

FIG. 9 illustrates an exemplary data structure of a connection table.

FIG. 10 illustrates an exemplary process for IP SAN determination.

FIG. 11 illustrates an exemplary process for generating and drawing a topological list display.

FIG. 12 illustrates an exemplary structure of patterns of topological connections.

FIG. 13 illustrates an exemplary data structure of generated and joined connection data.

FIG. 14 illustrates exemplary data structures of network and node objects instances and arrays.

FIG. 15 illustrates an exemplary process of object instance generation.

FIGS. 16A-16C illustrate exemplary basics for laying out of objects.

FIGS. 17A-17E illustrate an exemplary process of object layout.

FIGS. 18A-18C illustrate exemplary basics of drawing connection lines.

FIGS. 19A-19C illustrate an exemplary process of connection line drawing.

FIG. 20 illustrates an exemplary process for laying out and drawing of switches.

FIG. 21 illustrates an exemplary second embodiment of a user interface including topology presentation.

FIG. 22 illustrates an exemplary data structure of a matrix generated from the joined connection data including status indication.

FIG. 23 illustrates an exemplary third embodiment of a user interface including topology presentation.

FIGS. 24A-24C illustrate exemplary fourth embodiments of a user interface including topology presentation.

DETAILED DESCRIPTION OF THE INVENTION

In the following detailed description of the invention, reference is made to the accompanying drawings which form a part of the disclosure, and in which are shown by way of illustration, and not of limitation, specific embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Additionally, the drawings, the foregoing discussion, and following description are exemplary and explanatory only, and are not intended to limit the scope of the invention in any manner.

Embodiments of the invention, as will be described in greater detail below, provide a system, method and computer programs for generating and displaying a graphical user interface having a topological system configuration representation for enabling viewing, analysis and management of an information system. Embodiments of the invention are able to display a large number of items of an information system in a compact and efficient manner on a display device, such as a computer monitor, while also keeping the topological configuration information of the items intact and displayed for easy comprehension.

According to exemplary embodiments, a method of the invention carries out discovery of respective devices in an information system that is a target or object of management (i.e., a management target system). Some embodiments of the invention may automatically determine the existence of and also the relationships between networks, such as LANs (Local Area Networks) or SANs (Storage Area Networks) and any connected nodes (e.g., servers or storages), and store this information into a database. Additionally, exemplary embodiments of the invention generate end-to-end topology data of LAN=Server=SAN=Storage mapping by concatenating the network and node relations stored in the database. Under exemplary embodiments, based on the generated data, networks and nodes may be laid out according to a lattice of columns and rows, and displayed as icons in the user interface. Further, the relationships between the networks and nodes may be conveyed by displaying connecting lines in the user interface, thus providing a graphical topological display of the system in which the topology is also represented in a manner resembling to a lattice-like "matrix" or "list" style of display.

In exemplary embodiments, a displayed graphical user interface generated by the invention is composed of "rows" and "columns". Columns of the interface are composed of and represent system layers, and typically have a predefined location in the user interface according to the layer that each column represents. System layer columns set up in the user interface may include a backbone network column, a LAN column, a computer (e.g., server) column, a SAN column and a storage column. Icons and association or connection lines are aligned according to specific rows and objects for the networks and nodes, such as switches, servers and storages, which correspond to the "cells" of the list. Thus, the icons are laid out according to a lattice created by predefined columns and a variable number of rows. The number of rows used may be increased or decreased depending on the number of system component icons that need to be displayed, with the icons for each layer type being listed in their respective column.

In exemplary embodiments of the invention, by displaying the objects according to a lattice as a "topological list", wasted or redundant space is eliminated from the display, and thus more objects of the system are able to be displayed at any one time, while still accurately graphically representing the system topology. Furthermore, since embodiments of the invention incorporate a list style of topological display, functions such as sorting or filtering of the items in the IT system can be applied to the displayed system. As a result, embodiments of the invention provide a user interface that improves the efficiency of management of system availability and the performance, assisting in such tasks as daily monitoring of the status and health of the IT system, performing analysis of any problems that may arise, and determining solutions for the problems.

First Embodiments—Exemplary Hardware Architecture

FIG. 1 illustrates an example of a hardware architecture in which the invention may be practiced. The overall system consists of a management computer 100 and a management target system 110 (i.e., an information system that is the object of management). Management computer 100 and management target system may be connected through a local or wide area network (LAN or WAN) 120, or may be otherwise connected for enabling communication.

Management computer 100 may be a server or other generic computer that includes a CPU 101, a memory and storage 102, a network interface 103, one or more input devices 104, which may include a keyboard, mouse, and the like, and a display 105, which may be a monitor or the like. Management computer 100 is typically a computer terminal used by the system administrator for managing the management target system 110. Management target system 110 is an information system composed of network switches making up one or more networks, and also including servers and storage systems/devices which are targets or objects to be managed by the system administrator from the management computer 100. Exemplary details of the management target system 110 are described below, such as with reference to FIG. 3.

Logical Element Structures on the Management Computer

FIG. 2 illustrates exemplary embodiments of software and logical element structures that may be provided on the management computer. The modules and the data structures of the invention may be stored in memory/storage 102 or other computer readable medium, either in management computer 100, in a portable medium, or in another location. A discovery module 201 is configured to discover devices included within the management target system, such as switches, servers and other computers, and storage systems, arrays, and the like. An information collecting module 210 collects various types of information from the devices discovered by the discovery module, such as configuration information, connections between the devices, status and performance metrics and so on.

The collected data collected by information collecting module 210 is stored in database 230. Database 230 holds the collected data and a number of tables used for presenting the topological list view of the invention. A network table 500 holds information about identified LANs and SANs, as discussed below with reference to FIG. 6. A node table 600 holds identified nodes, such as switches, servers and storages, as discussed below with reference to FIG. 7. A component table 700 maintains relationships between networks and associated switches, as discussed below with reference to FIG. 8. A connection table 800 holds relationships between networks and connected nodes, as discussed below with reference to FIG. 9.

Topology presentation module 220 is software and/or hardware that generates end-to-end topology data from collected data and displays the generated topology data as a graphical topological list view, as discussed below with reference to FIG. 4. Topology presentation module 220 creates working data when creating and presenting the topology. The working data created and used includes joined connection data 1300, which may be represented as a matrix, table, or two-dimensional array, and which is a collection of the end-to-end topologies of the entire management target system that is generated based on the connection information stored in the database 230. LAN object array 1419, SAN object array 1429, server object array 1439 and storage object array 1449 hold respective network and node information extracted from the database 230 during creation and presentation of the topological list view, as described below with respect to FIG. 14.

Monitoring module 202 collects and maintains data on events that may occur in the management target system 110. For example, monitoring module 202 may maintain an event list of events sent from devices in the management target system 110, such as whether a particular server, storage or switch is operating correctly or not. Further, root cause analysis module 203 automatically determines the critical points of the management target system based on events observed. Reporting module 204 provides a variety of on-demand or periodical reports of system health status of the target management system 110. These modules serve as general components of the management software for providing system availability and performance management of the management target system.

Management Target System Structure

FIG. 3 illustrates one possible example of a system structure of an information system 110 that might be managed by the management computer 100. While the particular information illustrated in FIG. 3 is used to describe the invention, it should be understood that information systems having a limitless variety of configurations by be managed using the invention, and that the invention is not limited to any particular configuration of a management target system. For example, while the invention is described in the environment of Internet Protocol (IP) and Fibre Channel (FC) protocols, other suitable protocols might also or alternatively be used. Embodiments of the invention disclose an exemplary user interface to display a topology of a management target system, and also a methodology of how to represent the topology from information which is collected from nodes and other items within the management target system.

As illustrated in FIG. 3, management target system 110 may be composed of backbone networks 310, LANs 330, servers or other computers 340, SANs 350, and storages 370. Each individual switch, computer or storage might also be referred to a "node" in the management target system 110. A backbone network 310 is a network that includes the IP network structure itself, and which is composed of IP switches only, instead of having servers connected to it. For example, in FIG. 3, switches 320-1 and 320-2 are included in the backbone network because they only connect to other switches and are not connected to any of servers 340-1 through 340-10.

LANs 330 are sub-networks in the information system that include the IP switches 330 connected to servers 340 for carrying out communications and the like. For example, LAN 330-1 is composed of IP switches 320-2, 320-3 and 320-4, with servers 340-1 to 340-6 being connected to these switches 320-2, 320-3 and 320-4 (and thereby belonging to the LAN 330-1). Similarly LAN 330-2 is composed of IP switches 320-5 and 320-6, with servers 340-7 to 340-10 being connected to these switches 330-5 and 330-6. Thus, the LANs 330 and backbone network 310 may be communication networks used by servers 340 for communication, such as with client computers, or the like. Servers 340 may connected to SANs for enabling storage and retrieval of data used in the communications and for the running of any applications the might be in operation on servers 340. Further, while servers 340 are referred to as "servers" herein as a typical use case for computer nodes in a in information system, it should be understood that servers 340 may also be other types of computers, and the invention is not limited to computers having a specific function of acting as a server to a client. Thus, the term server is used interchangeably with the terms computer and computer node throughout the description, and it should be understood that this term is not intended to limit the invention to apply to computers that act only as servers, but instead, "server" can mean any type of computer node that performs a processing function.

SANs 350 are the storage area networks that sub networks in the information system that connect servers 340 with storages 370. In the illustrated embodiment of FIG. 3, SAN 350-1 is an IP SAN which composed of IP Switches 320-7 and 320-8. For example Network Attached Storage (NAS) or iSCSI (IP Small Computer System Interface) type of storages may connect to this type of SAN. Servers 340-1 to 340-7 are connected to SAN 350-1. Additionally, SAN 350-2 is a FC SAN which includes a FC Switch 360. Fibre channel type of storages, such as those having high performance FC disk drives may connect to this type of SAN. In the illustrated embodiment, servers 340-8, 340-9 and 340-10 are connected to SAN 350-2. Thus, storages 370 may be of the types able to communicate using IP or FC networks. Storage 370-1, for example, may be a storage system having a controller or NAS head and a plurality of disk drives of the SATA type or other suitable type, while storage 370-2 may be a storage system having a controller and a plurality of FC disks drives. Other types of storage systems may also be used with the invention, and the invention is not limited to any particular storage types.

User Interface with Topology Presentation (Topological List View)

FIG. 4 illustrates an example of a graphical user interface 150 providing a topological list view, which includes representation of the topology of the information system described above with reference to FIG. 3 in a manner that improves over the interfaces available in the prior art. The topology graphically shows the relationships between functional components or objects that are linked together in the information system. The user interface illustrated in FIG. 4 sets forth the topology of the target management system from the backbone network all the way through to the respective storage devices by utilizing node and network icons for representing objects in the system, and by representing connections between those objects using straight or stepped connector lines. In preferred embodiments, the user interface of the invention is able to represent system objects in a fashion similar to a "matrix" or "list" style of representation, while also maintaining a graphical representation showing connections that is easily grasped by the user. This is accomplished by laying out the topology according to a lattice having a variable number of rows of predetermined height and a predefined number of columns corresponding to each of the different type of elements to be represented (i.e., backbone network, LANs, computer nodes, SANs and storage nodes).

In the illustrated embodiment, user interface 150 includes five predefined columns representing five classes or layers of the information system. These columns comprise a backbone network column 411, a LAN column 412, a computer (or server) column 413, a SAN column 414 and a storage column 415. The order of the columns set forth in these embodiments, and in particular having the LAN=Computer=SAN=storage columns displayed adjacent to each other in the order shown enable generation of a very dense topological view of the system. Thus, each functional object in the management target system may be classified into one of the columns 411-415 of user interface 150, and identified as belonging to its respective layer of the management target system. Further, connection lines are created between objects located in the predefined columns and are aligned by specific "rows". Objects of the management target system, such as switches 320, 360, servers 340, and storages 370 are represented in corresponding cells or icons in the interface in a list-like manner by laying them out in their respective columns. By showing system objects as a list in this manner, the invention eliminates having redundant and wasted space on the screen, and thus is able to show more objects at once, while still also representing the physical system topology.

Backbone network column 411 contains IP switch icons 420-1, 420-2 representing switches 320-1, 320-2, respectively, which compose the backbone network 310. Each switch icon 420 preferably is represented by a rectangular cell, and may include an alphanumeric switch identifier 421 for the switch, such as "ipsw1" in the case of switch 420-1. In the illustrated example of FIG. 4, switch node icons 420 of the backbone network column 411 are listed simply in a single list and not presented according to a network structure, even if, for example, the backbone switches have a nested network relationship, or the like. This is because the structure of the backbone network itself typically is not so essential for the availability and performance management tasks carried out with respect to the management target system 110. Thus, it is not necessary to show lines connecting the backbone switch icons 420 to the switch icons 420 in the LAN column 412. However, in alternative embodiments, switch icons 420 can be presented along with respective network rectangles and connecting lines as well, similar to the arrangement in the LAN column 412 discussed below.

LAN column 412 vertically presents all sub networks (i.e., LANs) defined in the management target system 110 that are not defined as SANs. These sub networks typically have some servers or other computers connected to them, but in some embodiments may also have storages connected, and are typically used for communications between the servers, communications with client computers outside the management target system, communications with management computer 100, or the like. The method of defining these sub networks and determining whether a particular sub network in the information system is a LAN or a SAN is set forth below.

Each LAN icon 430 may include a rectangular cell having a network address identifier 431, and contains switch icons 420 of the IP switches 320 that comprise the particular sub network. For example, LAN icon 430-1 contains switch icons 420-2 to 420-4, which represent IP switches 320-2 to 320-4, respectively, thereby representing LAN 330-1 of FIG. 3. Similarly, LAN icon 430-2 contains switch icons 420-5, 420-6, which represent IP switches 320-5, 320-6, respectively, thereby representing LAN 330-2 of FIG. 3. Each LAN object icon 430 may show a network address 431 or other alphanumeric identifier as its identifier or name. Also, it should be noted that IP switch 320-2, which is given the identifier "ipsw2" makes up part of the backbone network 310 and also part of LAN 330-1, as illustrated in FIG. 3, and is represented in user interface 150 by switch icon 420-2 in both backbone column 411 and LAN column 412.

The height of each of the LAN icons 430 in the user interface 150 (and SAN icons 450 discussed below) is determined at least in part by the number of servers and storages connected to the particular sub network, and the number of corresponding icons represented for each of these, as is discussed further below. Defining a corresponding height for each LAN icon 430 makes it easier for an administrator or other user of interface 150 to recognize the association between a particular sub network and the corresponding servers and storages that are connected to the sub network using left-to-right horizontal viewing techniques without having to adjust the display vertically.

Computer column 413 presents computer node (server) icons 440 vertically. Each computer node icon 440 preferably is represented by a rectangular cell, and may include an alphanumeric computer identifier 441 for the computer, such as "srv1" in the case of computer node icon 440-1. Computer node icons 440 are, to the extent possible, listed adjacent to the LAN icon 430 of the particular LAN to which the computers are connected. For example, computer node icons 440-1 through 440-6 represent servers 340-1 through 340-6, respectively which are connected to LAN 330-1, as illustrated in FIG. 3. Thus, as illustrated in FIG. 4, computer icons 440-1 through 440-6 are connected to LAN icon 430-1, which represents LAN 330-1. Similarly, computer node icons 440-7 through 440-10, which represent servers 340-7 through 340-10, are connected LAN icon 430-2, which represents LAN 330-2.

SAN column 414 contains SAN object icons 450, representing all IP or FC SANs in management target system 110. SANs may be defined as networks which connect computers 340 with storage nodes 370, or storage nodes 370 with each other. Similar to the LAN object icons 430 for sub networks described above, each SAN object icon 450 may be represented by a rectangular cell having an alphanumeric SAN identifier 451 near the top of the rectangle for identifying a network address. The rectangular cell of the SAN icon 450 may also have a defined height in the display of the user interface 150 which corresponds to the number of connected computer or storage nodes. Each SAN icon 450 contains IP switch icons 420 or FC switch icons 460. For example, SAN icon 450-1 contains IP switch icons 420-7 and 420-8, which correspond to switches 320-7 and 320-8 making up SAN 350-1 of FIG. 3. Similarly, SAN icon 450-2 contains FC switch icon 460 which corresponds to FC switch 360, which makes up SAN 350-2 of FIG. 3. Each FC switch icon 460 may be represented by a rectangular cell having an alphanumeric FC switch identifier 461.

Storage column 415 contains storage node icons 470, presenting a vertical representation of the storage nodes in the information system. Each storage node icon 470 preferably is represented by a rectangular cell, and may include an alphanumeric storage identifier 471 for the particular storage node, such as "strg1" in the case of storage icon 470-1. In the illustrated example, storage icon 470-1, which represents to storage 370-1, is connected to SAN icon 450-1, which represents SAN 350-1, thereby representing the relationship set forth in FIG. 3. Similarly, storage icon 470-2 is connected to SAN icon 450-2, thereby representing the relationship of FIG. 3 in which storage 370-2 is connected to SAN 350-2.

Connections between sub networks (e.g., LANs, SANs) and nodes (e.g., servers, storages) are represented in user interface 150 by horizontal connecting lines 490 and stepped connecting lines 491. Since the network object icons 430, 450

(i.e., the rectangular cells) are drawn with a height defined to correspond with the number of connected server node icons and/or storage node icons, there is enough space to clearly draw respective connection lines 490, 491. This reduces errors on the part of users of the interface 150, which might arise from mistaken associations resulting from misinterpreting densely drawn lines. Four types of connections drawn in the illustrated embodiment are (a) LAN to computer; (b) computer to SAN; (c) SAN to storage; and (d) LAN to storage. In this embodiment, a direct connection between a computer node and a storage node (i.e., not through a SAN) is not shown in the user interface 150, and instead a storage node that is directly connected to a computer node is treated the same as if the storage node were internal disks in the computer node. However, in other embodiments, a direct connection between a computer node and a storage node can also be shown on user interface 150.

Additional information may be shown on each icon for the network icons, node icons or even on the connection lines. For example, additional information provided by each icon to aid in availability management and performance management can include health status of the nodes, configuration information, such as OS type, redundancy of the connection, and so on. The additional information can be retrieved from the system by the information collecting module 210 and monitoring module 202. Thus, each switch icon 420, 460, network icon 430, 450, computer icon 440, storage icon 470 or connection line may include a status indicator, such as status indicators 480 that indicates the status of the particular piece or pieces of equipment represented by the icon, or the like. For example, when the associated equipment is functioning properly, the status indicator 480 may show a check mark and/or may be colored green, or the like. When the equipment is not functioning properly, the status indicator may change color or shape, for example, as illustrated by status indicator 480 of computer icon 440-4, in which the status indicator has changed color, such as to red, and shows an "X" instead of a check. The status indicators 480 may also include a warning level, such as turning yellow, or the like, when a piece of equipment is functioning close to a critical level, but has not yet failed. Other information may also be associated with particular icons in the user interface, with the illustrated embodiment of FIG. 4 being only one of a number of possible embodiments.

The user interface 150 of the invention, an example of one embodiment of which is illustrated in FIG. 4, provides representation of the system topology in what is referred to herein as a "topological list view". Such a characterization is appropriate because, while the topology of the invention is graphically represented for easy comprehension of connection relationships in the system, the representation of the topology also resembles a list or matrix of the components in the information system because the components are laid out according to a lattice of rows and columns. The user interface is arranged under the invention so that the frontend components all the way through to the backend components can all be viewed on a computer display 105 without adjusting the display horizontally. In particular, the five columns, namely, the backbone column 411, LAN column 412, computer column 413, SAN column 414 and storage column 415 all fit legibly on a standard size computer display for easy viewing without having to use a horizontal scroll bar. Additionally, a conventional vertical scroll bar 495 may be included on the right side of the interface, and/or up/down arrow buttons 494 such as in the tray at the bottom of the interface may be provided with the user interface to enable the user to move the displayed topology up and down in the vertical direction should some portions of the topology not be visible in the display area of the user interface.

Data Structures and Processes for Generating the User Interface

Embodiments of the invention generate and display a novel user interface that includes a graphical topology representation arranged in a list-like manner. The data structures and processes for generating and displaying the user interface are described next.

Management Target Device Discovery and Models Used

Discovery of each switch, computer and storage device within management target system 110 may be carried out initially for creating the topology representation. A number of techniques are known in the prior art for collecting information of devices contained within an information system, with one example being set forth by Chang et al. in U.S. Pat. No. 7,249,347, which was incorporated herein by reference. Accordingly, details of the steps carried out by discovery module 201 do not need to be described in further detail.

After devices contained in the management target system 110 are discovered by discovery module 201, a list of the devices discovered may be generated, which represents all the devices in the management target system that will be subject to management using the user interface generated under the invention. Information collecting module 210 then collects information from each of the respective devices so as to determine all the connections between networks 310, 330, 350, such as LANs and SANs, and the nodes 340, 370, such as servers and storages. Information collecting module 210 then stores the collected connection information and the collected device information in a usable form by generating tables 500, 600, 700 and 800 of database 230. The relationships and data structures of each table are discussed further below with respect to FIGS. 5-9.

FIGS. 5A-5B illustrate examples of a data model and DB table relationships for storing data related to the system topology of the management target system. After discovering switches and nodes, and collecting information from devices in the system, the topology of the management target system is resolved and stored in the DB 230 using the models illustrated in FIGS. 5A-5B.

FIG. 5A illustrates the relationships between network table 500, node table 600 and component table 700 for identifying and determining relationships between the switches and the networks in the management target system. Network table 500 stores information on network objects such whether a particular sub network is classified as a LAN or SAN. Node table 600 contains information on node objects, which in this model of FIG. 5A correspond to switches. Component table 700 stores information that represents mapping between the networks the switches that are included within each network.

FIG. 5B illustrates the relationships between network table 500, node table 600 and connection table 800 for identifying and determining relationships between the computers and storage nodes and the networks in the management target system. The network and connected server and storage model includes tables that describe the networks and the interconnections with the server and storage nodes. Network table 500 stores information on network objects such whether a network is classified as a LAN or SAN. Node Table 600 stores information of the node objects, which in this model correspond to computers or storages. Connection table 800 stores information regarding mapping between the networks and the connected computers or storages.

Network Table

FIG. 6 illustrates an example of a data structure of a network table 500. Network table 500 holds the records for both LANs and SANs in the management target system 110. Network table 500 includes a network ID entry 510, which is an internal ID to identify the network; a network name entry 520, which is a description to be shown on the screen in the user interface for identifying the network; a network type entry 530, which specifies whether the particular network is an IP or FC network; and a display type entry 540, which specifies whether the network is classified under the invention as a LAN or SAN. For example, an IP sub network might be used as either a LAN or an IP SAN. In the example illustrated in FIG. 6, line 591 represents a record of a network which having an ID 510 of "Net1" and an IP address "10.10.33.0" as its name 520. Network "Net1" is an "IP" network type and is classified as a "LAN". Line 592 lists a network named "Net2", similar "Net1", but with a different IP address as its name 520. Line 593 also lists an "IP" network, similar to lines 591-592, but this network is used as a "SAN" instead of LAN. Further, line 594 lists a record for a "FC" network rather than an IP network.

Node Table

FIG. 7 illustrates an example of a data structure of node table 600. Node table 600 maintains information regarding switch nodes 320, 350, computer nodes 340 and storage nodes 370. Node table 600 includes a node ID entry 610 that shows an internal identifier used to identify the node; a name entry 620, which provides a description to be shown in the user interface 150 to identify the node; and a node type entry 630, which specifies whether the node is a switch, a computer (e.g., server) or a storage node. For example, line 691 shows a record of a "Switch" node which has "Node1" as the node internal ID 610 and "ipsw1" for the node name 620. Similarly, line 692 is a record for a "Server" node and line 693 is a record for a "Storage" node.

Component Table

FIG. 8 illustrates an example of a data structure of a component table 700. Component table 700 represents the composition of the switches within a network. Component table 700 includes an component ID entry 710, which provides an internal identifier used for identification of the component; a network ID entry 720, which provides a the ID the network which corresponds to the node are involved, and a node ID 730, which identifies the corresponding node that is involved. For instance, line 791 represents a record of a component which has "Cmp1" as the ID and shows that a node identified as "Node1" is a component in the network having the network ID of "Net1". Similarly, line 792 is a record for a component "Cmp2" that shows a node identified as "Node4" is also a component in the network "Net1". Line 793 is a record for a component "Cmp3" that shows a node identified as "Node10" is a component of network "Net2". Thus, the component table associates identified sub networks of the network table 500 with the nodes identified in node table 600 that are included in the identified network.

Connection Table

FIG. 9 illustrates an example data structure of connection table 800. Connection table 800 represents the connections between networks and server and storage nodes. Connection table 800 includes a connection ID entry 810 that is used as internal identification of the connection; a network ID entry 820, that identifies a network that a corresponding node is connected to; a node ID entry 830, that identifies the Node that is connected to the network; and a connection number 840, that shows the number of connections between the network and the node. For example, line 891 is a record of a connection which has "Cnct1" as the connection ID and which shows that a node having a node ID "Node5" is connected to the network "Net1". If the connection has redundancy, this can be represented in the connection number 840 column. In some embodiments, for example, redundancy in a connection may be shown as a pop up dialog that appears on the screen when the corresponding association line is selected by the administrator.

Node Information Collection and Node Connection Determination

As discussed above, the information collecting module 210 collects information from respective devices in the management target system, and determines the connections between networks and nodes. The information collecting module stores the collected information in the database 230 and generates tables 500-800. Since information collecting module 210 has a list of devices that were discovered by the discovery module 201 and identified as being present in the management target system 110, the information collecting module 210 is able to obtain various conditions and attributes from each device in the system, such as network address related information, for example, IP address, MAC (Media Access Control) address, HBA (Host Bus Adapter) WWN (World Wide Name), port WWN, and the like. The information collection can be carried out using standard interfaces, such as WMI (Windows Management Instrumentation), SNMP (Simple Network Management Protocol), SMI-S (Storage Management Initiative—Specification), or vendor-proprietary interfaces for specific devices. Furthermore the information collecting module can use SSH (Secure Shell) to logon to the servers in the system to obtain information from the servers.

After collecting network-related information from respective nodes the information collecting module 210 determines whether the sub networks in the system and the nodes making up the sub networks should be classified as LANs or SANs based on the collected information. In some embodiments, for example, certain switches are identified as being part of separate sub networks (i.e., as making up separate LANs) when they have separate subnet addresses. For example, in FIG. 3, LAN 330-1 has a subnet address of 10.10.33.0, while LAN 330-2 has a subnet address of 10.20.33.0. Other methods for classifying switches within particular LANs may also be used. Initially, an IP network may be classified as a LAN and an FC network may be classified as a SAN. Then, the information collecting module 210 checks whether any of the IP networks that are classified as LANS are actually used as IP SANs.

FIG. 10 illustrates an example of a process for determining whether an IP network should be classified as a LAN or an IP SAN. The basic rule used here is to classify an IP network as a SAN if a storage device is connected and every connected server has another LAN connected on the other side.

Step 1000: As described above, every identified IP network is initially classified as a LAN based on the information collected from the nodes in the management target system.

Step 1010: The process selects a LAN from the list to determine whether the LAN should be reclassified as a SAN. When every LAN identified in the system has already been checked, the process ends.

Step 1020: According to the information gathered from storage nodes 370, the process checks whether any storage devices are connected to the selected LAN currently being evaluated. If one or more storage nodes are connected to the LAN, then the process goes to step 1030; otherwise, the process goes back to step 1010 to select the next LAN for examination.

Step 1030: According to the information gathered from computer nodes in the management target system, the process determines the identity of any computer nodes 340 that are connected to the LAN being evaluated.

Step 1040: The process selects a computer node identified in step 1030. If every computer node has already been examined, then that means that every server examined is also connected to another LAN, and the LAN currently being evaluated can be classified as a SAN, so the process goes to step 1060; otherwise, if all the computer nodes identified in step 1030 have not yet been examined, the process goes to step 1050.

Step 1050: If the computer node selected in step 1040 has a connection to another LAN in addition to the connection to the LAN being evaluated, then the process goes back to step 1040 to examine the next computer node. On the other hand, when a server being examined is found to be connected only to the selected LAN being examined, then the LAN being examined can be assumed to act as a LAN (i.e., a communications network) instead of a SAN, so there is no need to examine the remaining computer nodes, the LAN remains classified as a LAN, and the process goes to step 1010 to select the next LAN for evaluation.

Step 1060: When every computer node connected to the LAN being evaluated is determined to be connected to another LAN as well, then the IP network selected in step 1010 is classified as a SAN, and the process goes back to step 1010 to check next LAN. In addition, to better facilitate the classification of an IP network in the management target system as a LAN or SAN, a user interface can be provided to enable an administrator to directly classify the usage of an IP network as either a SAN or a LAN.

Through the method described thus far, the nodes and networks in the management target system are identified, and the connection types and network types are determined. Information collecting module 210 then stores this information into the database 230. Based on the information obtained from servers, switches and storages in the management target system, the information collecting module creates new records on the node table 600, and stores the information. Also, based on the identified LAN/SAN network information collecting module 210 creates new records on the network table 50 using the collected and determined information. Furthermore, information collecting module creates new records on the component table 700 based on which network the switches 320, 350 belong to, and creates new records on the connection table 800 based on which network each computer 340 or storage 370 belongs to.

After the discovery and data collection process has been completed, the entire topology information of the management target system has been stored in the database 230. When the administrator triggers a request for displaying a topological list view on the display 105, topology presentation module 220 is able to extract the object and connection information from the database 230 and use the extracted information to generate the user interface 150 having a topological list view of the management target system based on the information extracted from the database.

Process of Topological List View Generation

Steps for generating and displaying the topological list view in a user interface based on the system topology information stored in the database are set forth below. These processes are carried out by the topology presentation module, as described below. FIG. 11 illustrates the overall process performed to generate the user interface having a topological list view.

Step 1100: The topology presentation module 220 sends a query to the database 230 to extract the network and node connection information and to construct temporary data referred to as joined connection data 1300. This is the data from which the connections from LAN-to-computer node-to-SAN-to-storage node are concatenated, and the entire end-to-end topology of all the connections in the system can be joined in a single table or matrix, as illustrated in FIG. 13. Also, rows of data may be created and sorted during this step to control the order of the components to be drawn on the screen.

Step 1110: The process reads the joined connection data 1300 row by row, and generates object (LAN/Server/SAN/Storage) instances on the memory. At the same time, the process counts how many of the node objects are connected to respective network objects. This can then be used to determine the height of the network objects to be drawn in the topological list view.

Step 1120: The process lays out network and node objects from top to bottom of the displayed interface. During the laying out of objects on each row the topology presentation module 220 places networks and their connected nodes in a topological list view, such as the configuration illustrated in FIG. 4, to enable viewing in a horizontal fashion instead of placing objects too densely for easy viewing.

Step 1130: The process generates the connection lines between networks and their connected nodes.

Step 1140: The process lays out the switches that are in the backbone network(s), LAN(s) and SAN(s).

Generate Joined Connection Data

In this example, switches in the backbone network(s) are drawn independently from other topology at the end of the entire process. Therefore the topology of LAN=Server=SAN=Storage is generated first.

Under these embodiments, there are eight possible basic topology types that might be drawn for the four basic layers in the information system, as set forth below.

1. LAN=Server=SAN=Storage are all connected from end-to-end.
2. No LAN connection, but only Server=SAN=Storage.
3. No Storage connection, but only LAN=Server=SAN.
4. LAN=Server connection.
5. Server=SAN connection.
6. SAN=Storage connection.
7. LAN=Storage connection.
8. Server=Storage connection.

FIG. 12 illustrates these eight topology connection types in a matrix fashion. Topology pattern table 1200 includes a type entry 1210, a LAN column 1220, a server column 1230, a SAN column 1240 and a storage column 1250. Thus, it may be seen that lines 1291-1298 correspond to the eight possible topology connection cases 1-8, respectively, discussed above. By making a query to the database 230 to extract every connection that matches with the types set forth above and joining every connection into a single matrix, the process is able generate end-to-end connection data for the four basic layers in the information system, that then may be joined and represented in matrix or other form, and that holds every topology configuration in the system that needs to be drawn on the topological list view in the user interface. The generated temporary data is referred to herein as the joined connection data 1300, which may be represented in a matrix, table, array or the like, as illustrated in the matrix set forth in FIG. 13 containing exemplary entries based on the exemplary management target system illustrated in FIG. 3.

A query sent to the database 230 for generating the joined connection data 1300 is composed of queries that request the respective eight connection types described above. For example, collecting of connection type #4 records (i.e., LAN=Server connection type) can be carried out by selecting the information according to the following search query:
  Table:Network.NetworkID=Table:Connection.NetworkID and
  Table:Node.NodeID=Table:Connection.NodeID and
  Table:Network.DisplayType='LAN' and
  Table:Node.NodeType='Server',
in which "Table:Network", "Table:Node", and "Table:Connection" correspond to the network table 500, node table 600 and connection table 800, respectively, describe above with respect FIGS. 6, 7, and 9, respectively, and the various entries therein.

Obtaining the results using the above formula according to the format of [LAN, Server, SAN, Storage] as described with respect to FIG. 12, for the query for LAN=Server connections generate records filled with [(LAN Name), (Server Name), NULL, NULL] values (i.e., an empty space receives a "NULL" entry in the respective column). Thus, by sending respective queries in the same manner as described above to collect every type of connection of the seven connection types described above, a complete set of records can be obtained. On the query statement those records are concatenated by "UNION" (e.g., Query to collect type #1 connection) UNION (Query to collect type #2 connection) UNION . . . (Query to collect type #8 connection). During the query, execution result records will be sorted in alphabetical and numerical order. By performing such a sort at this stage, the same network objects are set forth in sequence, which makes them easier to layout in one location and also makes it easier for a user to read and locate desired items. The sorting can be done left-to-right by prioritizing the left-side column which is sorted by LAN name first, then the server name, then the SAN name, and lastly by storage name. "NULL" entries are handled as low priority during the sort.

FIG. 13 illustrates an example of connection data which is generated and joined into a matrix to create joined connection data 1300. Records are filled with actual LAN, server, SAN, and storage names according to the types of connections. Thus, the end-to-end connections of all of the components of each layer (LANs, computer nodes, SANs, and storage nodes) in the system are able to be listed in the joined connection data 1300. Empty spaces are filled with NULL values. For example, lines 1391 are matched for a connection type #1. For instance, the first record shows that LAN "10.10.33.0" has server "srv1" connected, and server "srv1" is also connected to SAN "192.168.11.0", which has storage "strg1" connected to it. On the other hand, lines 1395 are matched for connection type #6, with the last record showing that storage "strg11" is connected to SAN "Fabric-5", but that no connection to the servers or LANs are currently found to exist. Additionally, it should be noted that as a practical matter connection types #3 (LAN=Server=SAN) and #5 (Server=SAN) may not exist in some embodiments, since a SAN would not normally be expected to exist without a storage attached. Also, as discussed above, connect type #8 (Server=Storage) is not displayed on the user interface in the described embodiments because this connection type is treated as if the connected storage is the same as internal storage for the particular computer node. Processes described below use the joined connection data 1300 for generating respective topology representations on the memory of the management computer and for drawing and displaying the objects and connection lines on the display 105 for generating the user interface with topological list view 150.

Generating Object Instances

The topology presentation module may generate network or node object instances on the memory 102 by reading record-by-record sequentially starting from the top of the matrix created from the joined connection data 1300. An objective of this process is to create object instances and count the number of nodes (i.e., servers and storages) that are connected to respective networks (i.e., LANs and SANs).

FIG. 14 illustrates an example of data structures of network and node objects while temporarily stored on the memory 102. Furthermore every object instance may be stored as an array variable in a respective array, such as in a LAN object array 1419 for the instances for LAN objects 1410, a SAN object array 1429 for instances of SAN objects 1420, a server object array for instances of server objects 1430, and a storage object array 1449 for instances of storage objects 1440.

Each LAN object instance 1410 includes a Name 1411, which is the description to be shown on the user interface to identify the network; a StartRowNumber 1411, which is a row number where the LAN object will start to be drawn; and ConnectedNodes 1412, which is an array type of variable that lists either server object name or storage object name that is connected to this LAN object 1410. The order appended to this array will be referred to when drawing the server objects and/or storage objects. LAN object 1410 also includes a LayoutStatus 1413, which indicates whether the LAN Object is laid out or relocated, and which has three types of status, namely, "Initialized", "Laid Out" and "Fixed". "Initialized" indicates that an object has not yet been laid out; "Laid Out" indicates that an object has been laid out, but is still eligible to be relocated for optimizing the layout; while "Fixed" indicates that the object has been laid out and should not be relocated during optimization.

Each SAN object instance 1420 includes a Name 1421, which is a description to be shown in the user interface to identify the network; a StartRowNumber 1422, which is the row number where the SAN object will start to be drawn; ConnectedServers 1423, which is an array type of variable that lists server object names of servers which are connected to this SAN, with the order appended to this array being used for establishing the order of drawing the servers; ConnectedStorages 1424, which is an array type variable that lists storage object names of storages which are connected to this SAN; and LayoutStatus 1423, which indicates whether the SAN object has been laid out or relocated.

Each server object instance 1430 includes a Name 1431, which is a description to be shown in the user interface to identify the server; a RowNumber 1431, which is a row number where the server object will be drawn; a LayoutStatus 1433, which indicates whether the server object has laid out or relocated; a LeftSideOffset 1434, which is the offset value used when plural connection lines are drawn to different LANs from this server; and a RightSideOffset 1435, which is an offset value used when plural connection lines are drawn to a different SAN from this server. The offsets are explained further below with respect to the drawing description.

Each storage Object 1440 includes a Name 1441, which is a description to be shown in the user interface to identify the storage; a RowNumber 1441, which is the row number where the Storage Object will be drawn; a LayoutStatus 1443, which indicates whether the Storage Object has been laid out or relocated; and a LeftSideOffset 1444, which is the offset value used when plural connection lines are drawn to different LANs or SANs from this storage object.

FIG. 15 illustrates an example of a process for carrying out object instance generation. The expression "LAN.ConnectedNodes" used in FIG. 15 refers to the array variable named ConnectedNodes 1413 of the LAN object instance 1410. Similarly, the expressions "SAN.ConnectedServers" and "SAN.ConnectedStorages" refer to the array variables ConnectedServers 1424 and ConnectedStorages 1424, respectively, of the SAN object instance 1420.

Step 1500: The process selects a record from the joined connection data. For example, the joined connection data 1300 may be organized as a sorted matrix or table, as illustrated in FIG. 13 and as discussed above, and the records may be selected by starting with the first record at the top and proceeding sequentially in order toward the bottom. When every record has been processed, the process ends; otherwise the process goes to step 1505.

Step 1505: For the selected record, if the process finds LAN information, SAN information, server information or storage information, then the process goes to step 1510. After processing all found information in the record, the process goes to step 1520.

Step 1510: The process checks whether or not the found LAN, SAN, server or storage information has already been created as an object instance. If an object instance has already been created for the particular LAN, SAN, server or storage information, the process goes back to step 1505 for processing the next information, or else goes to step 1515 when an object instance does not already exist.

Step 1515: When an object instance does not already exist, the process creates a new object instance (as described above with respect to FIG. 14) for the respective LAN, SAN, server or storage information being processed. To carry this out, the process sets the Name 1411, 1421, 1431 or 1441, respectively, in the object instance and appends the created object instance to the array variable.

Step 1520: When the selected record selected in step 1500 has server information and it is a new server instance (i.e., a server object instance was created in step 1515), then the process also determines whether the server is connected to a LAN (i.e., a LAN is also found in the record). If so, the process goes to step 1525; otherwise the process goes to step 1530.

Step 1525: The process appends the Name of the new server object instance to the ConnectedNodes array 1413 of the LAN instance found in the record.

Step 1530: When the selected record selected in step 1500 has server information and it is a new server instance (i.e., a server object instance was created in step 1515), then the process also determines whether the server is connected to a SAN (i.e., a SAN is also found in the record). If so, the process goes to step 1535; otherwise the process goes to step 1540.

Step 1535: The process appends the Name of the new server object instance to the ConnectedServers array 1423 of the SAN instance found in the record.

Step 1540: When the selected record selected in step 1500 has storage information and it is a new storage instance (i.e., a storage object instance was created in step 1515), then the process also determines whether the storage is connected to a LAN (i.e., a LAN is also found in the record). If so, the process goes to step 1545; otherwise the process goes to step 1550.

Step 1545: The process appends the Name of new storage object instance to the ConnectedNodes array 1413 of the LAN instance found in the record.

Step 1550: When the selected record selected in step 1500 has storage information and it is a new storage instance (i.e., a storage object instance was created in step 1515), then the process also determines whether the storage is connected to a SAN (i.e., a SAN is also found in the record). If so, the process goes to step 1555; otherwise the process goes back to step 1500.

Step 1555: The process appends the Name of the new storage object instance to the ConnectedStorages array 1424 of the SAN instance found in the record.

Laying Out and Drawing Objects

FIGS. 16A-16C illustrate basic rules of object layout and drawing for preferred embodiments of the invention. In the illustrated embodiment, row position of each object in the user interface 150 may be determined based on the sequential order, as determined from the object instance generation of FIG. 15 and the sorted joined connection data, as in the sorted joined connection data 1300 illustrated in FIG. 13. Thus, object icons for the nodes or networks can basically be drawn sequentially from top to bottom of their respective columns 411, 412, 413, 414, 415. For each column 411, 412, 413, 414, 415, a row position pointer may be maintained as the pointer which indicates the row position of a row where the next object will be drawn. As illustrated in FIG. 16A, for example, there are a plurality of rows 1615 of a uniform height under the computer column 412. A row position pointer 1640 indicates the next row 1615 in which an object icon may be drawn in this column. "RowPosition" is used as the name of a variable for the respective row position pointer in the descriptions of the processes set forth below.

Additionally, layout optimization is necessary to ensure that the icons for each object are efficiently laid out for display in the user interface 150 to increase density and minimize wasted space in the display, while still clearly and legibly showing the association relationships and connections between the objects in the management target system. Layout optimization processing of the topology may preferably be carried out during row-by-row placement of the objects. For example, after initially placing objects on the latest row, the process is able to carry out optimization of the layout. For instance, the process checks whether any stepped lines can be realigned to create straight lines by moving the connected object icon downward one or more rows. This realignment is carried out because it is a premise of the invention that straight line connections between networks and nodes are the best type of representation for enabling a user to quickly grasp the correspondence between various objects in the topology, while also minimizing wasted space in the interface.

Movement of objects is typically only carried out by downward movement of one or more objects, as illustrated in FIG. 16B. Before movement of an object is carried out, the process checks that no other objects are placed below the object already. However, movement of objects downward multiple times can cause too much open or wasted space in the displayed user interface 150, which actually makes viewing of the system topology more difficult for the user. Therefore movement for optimization and realignment is limited under these embodiments to once for each object, after which the LayoutStatus of the object is set to "Fixed". For example, in FIG. 16B, server object icon 440, before optimization, was connected to LAN 430 by a stepped line, as shown at 1611. After optimization, server 440 is moved downward, and connected with LAN object icon 430 with a straight line 1612.

FIG. 16C illustrates how embodiments of the invention use a lattice of fixed columns and a variable number of rows 1615 for laying out object icons so that connected icons are placed on the same row when possible for straight line connection to provide a more dense topological display. Thus, the icons 430, 440, 450 and 470 representing objects of different layers (LANs, computer nodes, SANs and storage nodes, respectively) that are connected to each other are aligned on the same row(s) 1615, so that their connections may be more easily viewed by horizontal viewing in the user interface, without having to scroll the user interface vertically. The topology of the laid out icons of the user interface 150 is in accordance with the end-to-end connections identified in the joined connection data 1300, and therefore enables layout of the icons in a matrix-like arrangement. In the illustrated embodiments, the height of the rows corresponds to the height of computer node icons and the storage node icons. As discussed above, the height of the LAN icons and SAN icons correspond to the number of connected computer and/or server nodes. For example, as illustrated in FIG. 16C, LAN icon 430a has a height that corresponds to an integer multiple of the row height, and has three server nodes 440a, 440b, 440c laid out on corresponding rows on which LAN icon 430a is laid out. Row position pointers 1620, 1630, 1640, 1650 and 1670 are provided for each of the layer type columns 411, 412, 413, 414 and 415, respectively, for keeping track of the next available row 1615 at which a respective icon may be placed.

As also illustrated in FIG. 16C, a particular case for optimization occurs when a LAN is connected to a storage without a SAN, as illustrated in FIG. 16C. When a connection is from a LAN icon to a storage icon, the layout needs to be handled a little differently than in the other cases, since the connection line crosses both the computer column 413 and the SAN column 414. Assume that objects connected to first LAN icon 430a, including server icons 440a, 440b, 440c, a SAN icon 450a and storage icons 470a, 470b have been laid out, as illustrated. Next, the situation may be encountered in which the next LAN 430b that is laid out is connected to storage 470c without connection to a server or a SAN. When this happens, LAN 430b connected to storage 470c needs to be laid out below the lower of either the lowest server 440c or lowest SAN object 450a. LAN row position pointer 1630 is also moved to next row in LAN column 412 available for placement of the next LAN 430c. Row position pointer 1650 for SAN column 414 also needs to be moved to the same row in case there is a next SAN 450b to be laid out. Then the storage object icon 470c or a server object 440d is placed in the row below the row of the lowest server or SAN object, as illustrated in FIG. 16C. By following this rule of movement, enough vertical separation is maintained to enable drawing of a connection line 1614 from LAN 430b to storage 470c in storage column 415, as illustrated. It should be noted however, that while connection line 1614 is shown for illustration purposes, the determination and generation of connection lines is not performed at this stage in these embodiments, but instead is made later, as discussed below. Also, the layout of switch icons, such as backbone switches and switches in the LANs, SANS is carried out later, as discussed below. Further, the storage row position pointer 1670 for the storage column 415 is moved below the latest storage object 470c, and also below any server object 440d or SAN object that might be drawn in between the LAN column 412 and the storage column 415. Similarly, the computer row position pointer 1640 for the computer column is moved to the next row below the most recently drawn server 440d.

Thus, it may be seen that laying out and drawing of objects for the user interface of the invention includes obtaining a record from the joined connection data 1300, and laying the object out according to the predetermined columns and next available row for each column, as illustrated in FIG. 16C. Initial layout is performed sequentially according to the joined connection data 1300, and the layout is optimized as each object is laid out, such as illustrated in FIG. 16B. Any LAN=Storage connection types are laid out as discussed above with reference to FIG. 16C.

FIGS. 17A-17E illustrate an example of a process performed by the topology presentation module 220 for object layout generation for carrying out the object layout discussed above.

Step 1700: The process initializes the row position variables 1620, 1630, 1640, 1650, 1670.

Step 1710: The process selects a record from the joined connection data 1300 in sequential order. After every record in the joined connection data has been processed, the process goes to step 2100 (FIG. 17E) to carry out object drawing.

Step 1720: The process determines which objects exist in the selected record (e.g., LAN, server, SAN and/or storage).

Step 1730: The process gets corresponding instances from respective array variables.

Step 1740: If the connection type is LAN=Storage, the process proceeds to step 1900 (in FIG. 17C); otherwise the process goes to step 1750.

Step 1750: If a LAN exists and its LayoutStatus 1414 is "Initialized" (i.e., it has not been laid out yet), then the process goes to step 1760 to layout the LAN; otherwise, if the particular LAN has already been laid out, the process goes to step 1810 (in FIG. 17B).

Step 1760: The process sets the start position of the LAN LAN.StartRowNumber as LANRowPosition determined from row position pointer variable 1630 in the LAN column 412.

Step 1770: The process counts the number of nodes (i.e., severs or storages) connected to the LAN.

Step 1780: The process adds the count to LANRowPosition to determine the row that will be next to the end of the LAN currently being laid out.

Step 1790: The process sets the LAN.LayoutStatus from "Initialized" to "Laid Out".

Step 1810: If a SAN exists in the record currently being processed, and the SAN LayoutStatus 1425 is set as "Initialized" then the process goes to step 1811; otherwise the process goes to step 1820.

Step 1811: The process sets the start position of the SAN SAN.StartRowNumber as SANRowPosition which is currently pointed to by SAN row position pointer 1650.

Step 1812: The process counts the number of both storage nodes and server nodes connected to the SAN.

Step 1813: The process adds the larger of the two counts to SANRowPosition.

Step 1814: The process sets SAN.LayoutStatus from "Initialized" to "Laid Out".

Step 1820: If a server node exists and its LayoutStatus is "Initialized" then the process goes to step 1821; otherwise, the process goes to step 1827.

Step 1821: The process sets the position of the server Server.StartRowNumber as ServerRowPosition which is the row currently pointed to by server row position pointer 1640.

Step 1822: The process increments ServerRowPosition by incrementing the server row position pointer 1640.

Step 1823: The process sets Server.LayoutStatus from "Initialized" to "Laid Out".

Step 1827: If server and LAN exist in the record, and that LAN also has direct connection to a storage node, then the process goes to step 1828; otherwise the process goes step 1830.

Step 1828: The process just increments StorageRowPosition by incrementing the storage row position pointer 1870 (i.e., the StorageRowPosition and ServerRowPosition will be incremented simultaneously during the layout of Server and Storage objects connected to a LAN which has a direct storage connection.)

Step 1829: The process increments ServerRowPosition if ServerRowPosition was not incremented in step 1822 above, such as in a situation in which the server instance already has "Laid Out" or "Fixed" in the LayoutStatus 1433.

Step 1830: If a storage node exists in the record and its LayoutStatus 1443 is "Initialized", then the process goes to step 1831; otherwise, the process goes to step 2000 in FIG. 17D.

Step 1831: The process sets the position of the storage Storage.StartRowNumber as StorageRowPosition, which is the row currently pointed to by server row position pointed 1670.

Step 1832: The process increments StorageRowPosition by incrementing the storage row position pointer 1670 to the next row.

Step 1833: The process sets the Storage.LayoutStatus from "Initialized" to "Laid Out".

FIG. 17C, steps 1900 through 1990, set forth the handling of the situation when there is a LAN connected directly to a storage without an intervening connection to a server or SAN, as the process is redirected from step 1740 in FIG. 17A.

Step 1900: If LAN.LayouStatus is "Initialized" (not laid out yet) then, the process goes to step 1930; otherwise the process goes to step 1910.

Step 1910: The process checks whether LAN.ConnectedNodes has another storage instance which has already been laid out. If such another storage instance exists, then the process goes to step 1920 (i.e., the process leaves the LAN object as currently placed); otherwise the process goes to step 1930.

Step 1920: The process sets Storage.RowNumber as the current StorageRowPosition corresponding to the current storage row position pointer 1670, and increments both StorageRowPosition and ServerRowPosition by incrementing the respective pointers 1640, 1670.

Step 1930: The process set the start position of the LAN as the position of the lower one of the server (ServerRowPosition) or SAN (SANRowPosition).

Step 1940: The process counts the server and storage nodes connected to the LAN.

Step 1950: The process adds the count to the LANRowPosition (i.e., increments the LAN row position pointer to the next row that will follow the end of the LAN object).

Step 1960: The process sets the LAN.LayoutStatus as "Fixed" (i.e., it will not be relocated after this process is complete).

Step 1970: The process sets the SANRowPosition to the same row as the LANRowPosition.

Step 1980: The process sets the Storage.RowNumber to be LAN start position, and also sets StorageRowPosition and ServerRowPosition to the next row by incrementing the respective row position pointers 1670, 1640.

Step 1990: The process set Storage.LayoutStatus as "Laid Out".

FIG. 17D sets forth the steps carried out for optimization of the laid out elements, as set forth in steps 2000 through 2065.

Step 2000: If a LAN=Server connection type exists, the process goes to step 2005.

Step 2005: The process counts the number of server and storage nodes connected to the LAN.

Step 2010: The process checks whether the server object row number is between the start and end row of the LAN. If the server object is in a row that is between the start row and the end row of the LAN, the position does not need to be changed, and the process goes to step 2060; otherwise, if the server object is out of this range, the process goes to step 2015.

Step 2015: The process compares the locations to determine whether the server or LAN object is in the upper position (i.e., starts at an earlier row).

Step 2020: If the LAN object is in the upper position then the process checks that the LayoutStatus 1414 is not set as "Fixed" and that the LAN object is currently placed in the lower-most position of all the LAN objects already laid out.

Step 2024: The process finds the position (Nth) of the server object stored in LAN.ConnectedNodes, and sets the found number to the variable N. For example, if the LAN icon was determined to have a height equal to five rows because the number of connected nodes is five, and the server object is the third node to be connected, then the variable N is equal to "3" in this example.

Step 2025: The process calculates a value "v_Diff" which is equal to the difference from server row position to the Nth row of the LAN.

Step 2030: The process adds the value "v_Diff" to LAN.StartRowNumber and LANRowPosition which results in the LAN object being moved lower a number of rows equal to the amount of "v_Diff".

Step 2035: The process sets the LAN.LayoutStatus as "Fixed".

Step 2040: On the other hand, if the server is in the upper position, then the process checks that its LayoutStatus is not "Fixed" and that the object is currently placed in the lower-most position servers already laid out.

Step 2045: The process calculates the value "v_Diff", which is the difference between the start positions of the LAN object and the server object.

Step 2050: The process adds the value "v_Diff" to Server.RowNumber and ServerRowPosition, which results in the server object being moved lower a number of rows equal to the amount of "v_Diff".

Step 2055: The process set Server.LayoutStatus as "Fixed", i.e., the server will not be moved again in further optimization.

Step 2060: The process carries out optimization between the server and the SAN, if any, using the same process of steps 2000 through 2055, as set forth above with respect to the connection between the LAN and the server. If the server LayoutStatus 1433 has been set to "Fixed", as discussed above, then the server object will not be moved during optimization.

Step 2065: When the LAN=server optimization and server=SAN optimization are complete, the process checks for a SAN=storage connection for this instance. If a SAN=storage connection exists, the optimization process is carried out using the same steps 2000 through 2055 as described above with respect to LAN=server connection layout optimization. If the SAN LayoutStatus 1425 has been set to "Fixed", then the SAN object will not be moved during optimization.

FIG. 17E sets forth steps 2100 through 2170 which carry out the actual drawing of the objects in the user interface, i.e., display generation.

Step 2100: The process selects a LAN object instance 1410 from the LAN object array 1419. If there are no LAN object instances, or if all the LAN instances have already been drawn, the process goes to step 2120.

Step 2110: The process draws a rectangle (i.e., a rectangular cell) for the selected LAN object instance at the Start RowNumber 1412, with the height of the rectangle being determined based on the number of connected nodes (from ConnectedNodes 1413). The process also adds the Name 1411 of the LAN.

Step 2120: When all the LAN instances have been drawn, the process selects a SAN object instance 1420 from the SAN object array.

Step 2130: The process draws the rectangle (i.e., a rectangular cell) for the selected SAN at the StartRowNumber 1422 with the height of the rectangle being determined based on the larger number of the number of ConnectedServers 1423 and the number of ConnectedStorages 1424. The process also adds the Name 1421 of the SAN.

Step 2140: When all the SAN instances have been drawn, the process select a server object instance 1430 from the server object array.

Step 2150: The process draws a rectangle (i.e., a rectangular cell) at RowNumber 1432 indicated in the server object instance. The process also adds the Name 1431 of the server to the rectangle.

Step 2160: When all the server objects have been drawn, the process selects a storage object instance 1440 from the storage object array.

Step 2170: The process draws a rectangle (i.e., a rectangular cell) at the RowNumber 1442 specified in the storage object instance 1440. The process also adds the Name 1441 of the storage object instance to the rectangle. Additionally, it should be noted that lay out and drawing of the switch icons into the user interface 150 is performed in these embodiments after drawing of connection lines, as discussed below, but could alternatively take place sooner.

Drawing Connection Lines

After each object of the management target system has been drawn for use in generating a display, the connection lines may be drawn next. FIGS. 18A-18C illustrate some basic rules used for drawing the connection lines in these embodiments. Coordinates, such as "(x, y)" coordinates may be used to designate the start and end points of connection lines, as well as mid points in the case of stepped lines. FIG. 18A illustrates a basic straight connection line 2210 between two objects 2221, 2222. For example, the "x" axis coordinates "X1" and "X2" represent two different "x" axis locations for the edges of the respective objects 2221, 2222, while the "y" axis coordinates are the same "Y1" for both the beginning and end point of the line. When only one line is to be connected to an edge of an object, the "y" coordinate may be located at the center of the object. However, when multiple lines are connected to one or both of the objects, the "y" coordinate may be offset up or down, and the corresponding "y" coordinate at the connected object is offset the same amount as well, so as to keep the line horizontal.

Similarly, as illustrated in FIG. 18B, (x, y) coordinates may be used to define a stepped line 2220 between two objects 2223, 2224 which are not in line with each other, such as when they exist on different rows. Stepped line 2220 is drawn using four sets of (x, y) coordinates, namely, (X1, Y1), (X2, Y1), (X2, Y2) and (X3, Y2) to define the line. In these embodiments, the invention limits all connecting lines to either straight lines or stepped lines to enable easier comprehension by a user viewing the user interface 150.

Upper and lower direction grids can be used, as illustrated in FIG. 18C when drawing stepped lines between objects which have different heights. For example, topology presentation module 220 uses an upper direction grid 2235 and a lower direction grid 2236 to maintain a predetermined distance between multiple stepped lines. Stepped lines 2230 that connect from left to right in an upward direction a laid out using upper direction grid 2235, while stepped lines 2240 that connect from left to right in a downward direction are laid out using lower direction grid 2236. As illustrated, upper direction grid 2235 and lower direction grid 2236 are laterally offset from each other so that the vertical portions of the lines do not overlap even when a large number of connection lines must be drawn.

FIGS. 19A-19C illustrate an example of a process of drawing connection lines in these embodiments of the invention. The steps to draw connection lines are basically (1) draw lines between LAN and server/storage nodes; (2) draw lines between server nodes and SANs; (3) draw lines between SAN and storage nodes. Lay out and drawing of switch icons for generating the user interface 150 is performed after drawing the connection lines in these embodiments, as discussed below.

Drawing Lines between LAN and Server/Storage Nodes

Step 2300: The process initializes the coordinate "X1" as being the right side edge of the LAN object rectangle.

Step 2310: The process selects a LAN instance from the LAN array 1419.

Step 2320: The process sets the row variable "R1" equal to the LAN start position.

Step 2330: The process initializes grid position variables (to use in this LAN), as illustrated in FIG. 18C. For example, the upper direction grid 2235 may be initialized to the left most position, and the lower direction grid 2236 will be initialized to right-most position (i.e., the position on the direction grids to be used first if a stepped line is drawn).

Step 2340: The process selects a node, either a server node or a storage node, from LAN.ConnectedNodes array 1413 for the LAN object instance 1410 currently being processed.

Step 2350: The process finds corresponding server node instances 1430 or storage node instances 1440 by the name from server array 1439 or storage array 1449, respectively.

Step 2360: The process sets row variable "R2" equal to the RowNumber 1432 or 1442 of a found node instance.

Step 2370: If R1 (Nth portion of LAN) and R2 (server/storage node) are on same row (R1=R2), then the process goes to step 2400 in FIG. 19B; otherwise, the process goes to step 2500 in FIG. 19C.

Step 2380: After drawing the line in the process of FIG. 19B or 19C, the process increments R1 and check for the next node objects.

FIG. 19B is directed to the case in which a straight line is to be drawn, i.e., R1=R2 in step 2370.

Step 2400: The process sets coordinate "X2" as being the left side edge of the server or storage node object obtained in step 2350.

Step 2410: The process gets the LeftSideOffset value 1434 or 1444 of the server or storage node instance, respectively, and then increments this value by one in the instance.

Step 2420: The process sets coordinate "Y1" equal to the default position of row R1 plus the offset value LeftSideOffset obtained in step 2410.

Step 2430: The process draws a straight line from (X1,Y1) to (X2,Y1), and then the process goes back to step 2380 in FIG. 19A.

FIG. 19C is directed to the case in which a stepped line is to be drawn, i.e., R1≠R2 in step 2370.

Step 2500: The process sets coordinate "Y1" equal to the default position of row "R1".

Step 2510: The process sets coordinate "X2" equal to the "grid" value, which is the value of the x axis for determining where the vertical part of the stepped line will be drawn. Each node may have its own grid value if needed and thus, the grid value may be one of UpperGridForServer, LowerGridForServer, UpperGridForStorage or LowerGridForStorage, based on found instance (server or storage) in step 2350 and whether the node is on a row higher or lower than R1. If the upper direction is used, then the respective grid value is increased by one; otherwise, if the lower direction is used, the respective grid value is decreased by one.

Step 2520: The process gets the LeftSideOffset value 1434 or 1444 of the server node instance 1430 or storage node instance 1440, respectively, and then increments the LeftSideOffset value.

Step 2530: The process sets coordinate "Y2" equal to the default position of row "R2" plus the offset value obtained in step 2520.

Step 2540: The process sets coordinate "X3" equal to the left side edge of the node object rectangle.

Step 2550: The process draws the stepped line by drawing three lines (X1,Y1) to (X2,Y1), (X2,Y1) to (X2,Y2) and (X2,Y2) to (X3,Y2). Following drawing of the stepped line, the process goes back to step 2380 in FIG. 19A.

Drawing Lines between Server and SAN

Steps for drawing connection lines between computer node and SAN objects are almost same as illustrated in FIGS. 19A-19C. Of course, SAN instance data is used instead of LAN instance data. Further, the row variables "R1" and "R2" are switched in usage due to the fact that the positions of the SAN icons are on the opposite side of the server icons.

Drawing Lines between SAN and Storage

Steps for drawing connection lines between SAN objects and storage node objects is almost the same as illustrated in FIGS. 19A-19C, except that SAN instance data is used instead of LAN instance data, and only storage object instances need be considered.

Layout and Draw Switches

In these embodiments, as one example, switches in the backbone networks are simply listed in the backbone network column 411, without having network structure representation drawn in. Thus, in the embodiments illustrated, connection lines are not made to individual switch icons. Instead, as illustrated in FIG. 4, the switch icons are 420, 460 are just listed in their respective network locations. For example, switch icons 420-1, 420-2, corresponding to the backbone, are listed in backbone column 411 with no connection lines to them. Similarly, switch icons 420-2, 420-3, 4204 are listed in the rectangle of LAN icon 430-1, with no connection lines connected to the switch icons 420-2, 420-3, 420-4. Instead, the connection lines connect only to the rectangle of the LAN icon. This method for displaying connections reduces the number of connecting lines to be displayed, thereby making the topological display less confusing and easier to comprehend. In other embodiments, however, the connections between each of the switches may also be presented in the user interface when providing the topological list view. After drawing the LAN, server, SAN and storage objects, and the connection lines between these objects, the topology presentation module draws all switch icons on the network icons already drawn. FIG. 26 illustrates an example of a process for drawing switch icons. Data required to draw the switch icons is obtained from the database 230.

Step 2600: The process selects a record from network table 500 of the database 230.

Step 2610: The process obtains the name 520 and display type 540, and if the display type 540 is a LAN, then the process goes to step 2620.

Step 2620: The process selects all switch nodes by relating the network table 500 with the component table 700 and the node table 600.

Step 2630: The process checks whether the LAN has any server or storage nodes connected. If no server or storage nodes are connected, and only switches are involved, the LAN can be determined to be a backbone network, and the process goes to step 2640.

Step 2640: The process adds the found switches (which are classified as belonging to the backbone network) to an array variable "v_BackboneSwitches", and the process goes back to step 2600.

Step 2650: The process finds the corresponding LAN instance from the LAN object array 1419, and obtains the StartRowNumber 1412 from the LAN object instance.

Step 2660: The process draws all switches selected in step 2620 in the LAN icon corresponding to the selected LAN object instance.

Step 2670: If the selected record selected from the network table in step 2600 is for a SAN instead of a LAN, then steps 2620-2660 are carried out for the selected SAN, by replacing "LAN" with "SAN" in each of the steps.

Step 2680: After drawing all the switches in the LAN and SAN icons, the process draws switches which have been classified as belonging to the backbone network in the backbone network column 411.

Drawing of the switches will generally complete the display of the user interface providing topology presentation. At this point, the user, typically an administrator is able to use a mouse or other interface to click on the various icons in the system to view additional information regarding the equipment represented by the icons. Furthermore, should the administrator feel that a switch icon, for example, is located in the wrong location, such as being located in a LAN instead of a SAN, or in the backbone instead of in a LAN, the invention may include provisions to enable the administrator to manually move an icon from on location to another.

Second Embodiments

In the first embodiments set forth above, the scope encompasses generating a topological representation of the entire system. However, since the invention uses a topological layout that also resembles a list or matrix based upon a lattice of rows and columns, the graphical user interface of the invention is compliant to having list-oriented functions applied to it, such as sorting of rows, filtering of items, or the like. The second embodiments described below set forth examples of methods for adopting sorting or filtering criteria, which may be specified by an administrator. Most of the components and behaviors are same as described above with respect to the first embodiments, and thus, the differences are described below.

As discussed in the first embodiments, the topology of the system displayed on the user interface with topological list view depends on what and how the connection information was listed on the joined connection data. After the connection data has been generated and processed to contain a desired content and order, the layout process lays out and draws those connections. Therefore, by adding sorting or filtering criteria to a query for generating the joined connection data 1300, or by performing a sort or filter on the result of the query, sorting or filtering of the topology can be carried out, and then only the sorted or filtered results are laid out and displayed.

User Interface with Topological List View and Sorting/Filtering

FIG. 21 illustrates an example of a topological list view which is able to specify sorting or filtering criteria for controlling the portion of the management target system topology displayed by the user interface 2150. Criteria may be specified in various ways, but in this example a sort criteria dropdown list 2710 and a filter criteria dropdown list 2720 are provided on the display 105 with the user interface 2150. An administrator is able to use the dropdown lists 2710, 2720 to choose desired sorting or filtering criteria by selecting from the respective dropdown lists 2710, 2720. Possible sorting or filtering criteria can include status of nodes, date of patch that has been applied, CPU workloads, OS or vendor type, user group, or even user-defined criteria.

Additionally or alternatively, a tree list 2730 can be used as another way of specifying a particular scope of topological display of the management target system or certain devices in the system. For instance, in one embodiment, selecting one of the user group folders in the tree list 2730, such as a folder named "ERP" is an operation carried out by a user for specifying filtering criteria of the topological list view presented in user interface 2150.

Additionally or alternatively, checkboxes 2740 may be added to the user interface, such as one check box 2740 per column, to enable an administrator to specify which column should have first priority on sorting rows. For example, in FIG. 21, computer column 413 has been checked, and thus, this column will be give first priority when sorting the entire connections of the management target system. In this example, when sorting by the status of the devices, the computers (servers) are sorted by their status types first, and then the other devices are sorted, which can enable an administrator to focus on finding and listing critical situations in the servers.

FIG. 22 illustrates an example of data of a matrix of the joined connection data 2800 generated in this embodiment. Joined connection data 2800 includes columns for LAN name 2810, server name 2830, SAN name 2850, and storage name 2870, similar to joined connection data 1300 discussed above with respect to FIG. 13. In addition, in these embodiments, joined connection data 2800 also includes a LAN status column 2820, a server status column 2840, a SAN status column 2860, and a storage status column 2880. In these embodiments, it may be assumed that the information collecting module 210 is configured to periodically collect the health status from the devices in the management system and store the collected health status information in the database 230. Sorting or filtering can be performed when sending the query to create the joined connection data 2800, or the sorting or filtering may be carried out after obtaining the results of the query by the topology presentation module.

In the example illustrated in FIG. 22, the administrator has specified sorting according to status by clicking on "status" on drop down menu 2710, and has also specified that the computer column 413 has first priority by checking box 2740 for column column 413, as illustrated in FIG. 21. Therefore, the servers that are in the most critical condition (such as overloaded or not functioning properly) are listed at the top of the list and the corresponding topology will be represented in this order when the topology presentation module performs lay out and drawing of the topology of the management target system on the display 105. For example, as illustrated in FIG. 22, servers "srv30" and "srv4" have a status of "critical", while server "srv1" has a status of "warning", and is listed after the critical status servers, while the remaining servers are listed as "ok". When the topology of the system is generated in the user interface 2150, the order of the system objects in the displayed topology will conform to the order set forth in the sorted joined connection data 2800.

Third Embodiments

FIG. 23 illustrates another alternative embodiment of the user interface with topology presentation 4150 of the invention. In the embodiment illustrated in FIG. 23, there are four predefined columns instead of five, namely, LAN column 412, computer column 413, SAN column 414 and storage column 415. Backbone column 411 of the prior embodiments has been eliminated from this embodiment. The switches of the backbone network can either not be included in the topology display, or may be displayed in their own LAN rectangle at the bottom of the LAN column, which may have a name 431 of "Backbone" or the like. The lay out and drawing of the icons, connection lines and the other elements of the user interface 4150 illustrated in FIG. 23 may be carried out in the manner as discussed above for the previous embodiments. Other alternative embodiments will also be evident to those of skill in the art in light of the disclosure given herein.

Fourth Embodiments

The examples discussed above in the first through third embodiments are directed to user interfaces of the invention for presenting a topological representation for managing hardware components in the IT system, such as switches, computers and storage devices. However embodiments of the invention, including the topological list view, can also be applied to generating and displaying a topological representation for managing not only physical components, but also logical components in the information system. Such logical components may include, for example, an executable software program instance such as database server instance, logically/virtually constructed elements, such as logical volumes created from storage capacity of hard disk drives (HDDs), virtual machines generated on a hypervisor running on a computer, and so on. There are logical associations that exist between these logical components that may be represented in graphical topological display of the invention. For example, logical associations that may be displayed using embodiments of the invention include the relationship between web=application=database server in a web three-tiered system; the relationship between virtual machines and a hypervisor which the virtual machines are running on; or associations between a logical volume and the RAID group that the volume is created from. Therefore, the topology of these components and the logical associations between the components can be displayed on the user interface that is described in this invention.

Also, as described in the previous embodiments, connection information between hardware devices can be collected via existing means such as WMI, SNMP, SMI-S and so on. In a similar manner, logical associations, such as those discussed above can be obtained via proprietary or standard interfaces. For instance, the relationships between the hypervisor and virtual machines can be obtained from the management software of the virtual machines. Similarly, the relationships between logical volumes and RAID groups can be obtained from storage management software or an embedded module on the storage device itself. Such collected information of logical components and their logical associations is stored in the database 230 illustrated in FIG. 2. The collected information can be retrieved by using a query sent from topology presentation module 220, in the same manner as described in the prior embodiments. Furthermore, in the previous embodiments, the labels used for representing the topology layers in the user interface 150, 2150, 4150 were "Backbone", "LAN", "Computer", "SAN" and "Storage". However, when the logical components are applied to this invention for display in a topographical representation, those labels, which is the "class" of the topology layer, are different from those described above in the first through third embodiments. Thus, the fourth embodiments describe examples of various topologies that include logical components as part of the IT system, and that show the respective class labels used in those examples.

FIG. 24A illustrates an exemplary topology of a web three-tiered system 5100. The system is composed as having three tiers of server programs, which are "Web Server", "Application Server" and "Database Server". These tiers are displayed as the label name of their respective columns on the topological list view as web server column 5110, application server column 5120 and database server column 5130. In the web server column 5110, each web server icons 5140 are listed as representing each server functioning as a web server in the information system. The icon 5140 of this type, as with computer node icons 140, and may be of a height corresponding to a single row height, and thus, may be aligned one per row. On the application server column 5120, as similarly, application server icons 5150 are listed as representing the application servers in the information system. The icons 5150 of this type may also be of a height corresponding to a single row height, and may also be aligned one per row as well. Similarly, database server icons 5160 are listed in the database server column 5130 of the user interface 5100 for representing servers in the system acting as database servers, and are of a similar height and alignment. Connection lines are drawn between the web server icons and particular related application server icons, which represent the logical associations between the web server instances and the application server instances in that the respective icons represent in the information system. Similarly, connection lines are drawing between the application server icons 5120 and the database server icons 5160 representing database server instances that are being used by particular application server instances.

FIG. 24B illustrates an exemplary topology representation in a user interface 5200 for an information system that has a plurality of virtual machines and connected to storages through a SAN. For example, such an information system may be similar to the information system described in the prior embodiments, such as with respect to FIG. 3, but also includes virtual machines as components belonging to hypervisors instead of the physical "computer nodes" described in the embodiments above. For example, VMware Inc. of Palo Alto, Calif. provides virtual machine software. Thus, the computer column 413 may be replaced with a virtual machine column 5210 and a hypervisor column 5220. SAN column 414 and storage column 415 shown in this embodiment are similar to the previous embodiments. On the virtual machine column 5210, respective virtual machines icons 5250 are listed, each having a height corresponding to a single row height, similar to the "computer" or "server" icons shown in the prior embodiments. In the hypervisor column 5220, hypervisor icons 5260, are displayed, which represent hypervisors in the information system that run virtual machines in the information system. Virtual machine icons 5250 are listed for each virtual machine instance in the information system, and connection lines are drawn based on the dependency between the virtual machines and their respective hypervisors. Since a hypervisor is able to run a plurality of virtual machines, each hypervisor object icon 5260 has a row height corresponding to the number of connected virtual machines. Thus hypervisor icon 5260-1 has a height corresponding to two rows in accordance with having two related virtual machines 5250-1 and 5250-2, while hypervisor icon 5260-2 has a height corresponding to only one row height, as only one virtual machine icon 5250-3 is connected thereto. SAN column 414 for the SAN layer and storage column 415 for the storage layer may be the same as described in prior embodiments. From the hypervisor icons 5260, connection lines are drawn to the SAN icon 450, representing the particular SAN instance to which the respective hypervisor instances are connected in the information system.

FIG. 24C illustrates an exemplary topology representation in a user interface 5300, for an information system that has database instances and logical volumes that have been constructed, such as by a logical volume manager, from underlying RAID groups, which in turn are composed from HDDs in the information system. The topology display may include a HDD column 5340, in which respective HDD icons 5380-1 through 5380-8 are listed, each having an icon height corresponding to a single row height. A RAID group column 5330 lists RAID group icons 5370 corresponding to RAID groups created on the HDDs of the information system. Connection lines connect the RAID group icons to the respective HDD icons 5380 of the HDDs that make up the respective RAID groups in the information system. The row height of each RAID group icon 5370 corresponds to the number of HDD icons connected thereto, and the HDD icons are aligned by row with their respective RAID group icon 5370. A logical volume column 5320 contains logical volume icons 5360 that are constructed from each RAID group in the information system. Each logical volume icon 5360 is connected to the specific RAID group icon 5370 that provides the capacity for it. In addition, database icons 5350 are listed in a database column 5310, and shown as being connected to the logical volume icons 5360, to represent which database instances in the information system are using which particular logical volumes in the information system. The row height of each database icon 5350 may correspond to the number of volume icons connected thereto.

Thus, as illustrated by the above embodiments, both hardware components and logical components of an information system can be separated by type or class. Connection data can be collected and sorted to determine connections between objects of different classes. Columns representing each class of object to be represented in a system topology can be generated in the user interface with a variable number of rows for containing a variable number objects of each class listed according to the predetermined columns. The icons representing objects in each class are laid out in accordance with the end-to-end connection data, as described above, and the layout is optimized to attempt align icons for connected objects on or near the same row. Then connection lines are drawn to represent connections or associations within the information system. Thus, system topology for any number of hardware and/or logical components of an information system may be represented using the dense user interface of the invention.

Accordingly, it will be apparent that embodiments of the invention provide an efficient method to improve density of displaying topological relationships of many management target objects in a user interface, while still enabling a user to easily comprehend the associations between the various objects in the management target information system. Embodiments of the invention provide a system topology that is laid out according to a lattice of a predefined number of columns and a plurality of rows that may be increased or decreased depending on the number of components to be displayed so as to create a list-like or matrix-like graphical viewing format which simultaneously achieves both high density and clearly classified topology. Thus, icons representing objects of the same system layer are aligned according to their predetermined columns, and further, icons that are connected to each other across the system layers are aligned in the same row(s) when possible. Further, while an exemplary embodiments of a user interface have been described and illustrated as having predefined vertical columns and a variable number of horizontal rows, it will be appreciated by those skilled in the art that the arrangement could be rotated 90 degrees or flipped sideways in other embodiments, so that the predefined columns run horizontally and the variable rows run vertically. Other variations will also be apparent in light of the disclosure herein.

Additionally, those skilled in the art will appreciate that the foregoing described exemplary embodiments can be implemented using, for example, various types of computer systems. Graphical user interfaces according to the present invention can, for example, be used in conjunction with a management computer such as that illustrated in FIGS. 1 and 2. Of course, the computer illustrated in FIGS. 1 and 2 is purely exemplary of one type of computer system in which user interfaces presenting topological views according to the present invention may be implemented. The computer system can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the topology presentation module and/or the other modules used in the invention.

From the foregoing, it will be apparent that embodiments of the invention provide methods and apparatuses for generating and displaying a user interface providing a representation of system topology in a manner that combines graphic representation with list view advantages. Embodiments of the user interface of the invention improve system availability and performance management operations. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A method of generating a user interface having a graphical topological representation of an information system, the method comprising:
   collecting information regarding connections or dependencies between components in the information system, the components including a hardware component or a logical component;
   classifying the components into a plurality of classes by classifying first components to a first class, and classifying second components to a second class;
   displaying the graphical topological representation of the information system in the user interface, by performing operations comprising:
   (1) selecting one of the first components;
   (2) selecting two or more of the second components, which are connected to or depending from the one of the first components in the information system;
   (3) determining display positions of second icons representing the two or more of the second components, in a second column for the second class;
   (4) determining a display position of a first icon representing the one of the first components, in a first column for the first class;
   (5) determining a height of the first icon representing the one of the first components based on heights of the second icons representing the two or more of the second components, which are connected to or depending from the one of the first components in the information system; and
   (6) displaying the first icon and the second icons with the determined display positions and heights, wherein:
      the graphical topological representation of the information system is displayed with a predetermined number of columns, and
      the predetermined number of columns are predefined and fixed for display in the interface, and scaled to fit within a display provided on a computer monitor;
   providing a sorting or filtering menu as part of the user interface; and
   displaying a modified graphical topological representation of the information system in the user interface in accordance with the selected sorting or filtering criteria.

2. The method according to claim 1,
   wherein the first and second components are hardware components or logical components.

3. The method according to claim 2,
   wherein the hardware components comprise switches, computer nodes, storage nodes, or hard disk drives, and
   wherein the logical components comprise LANSs, SANs, databases, web server programs, application server programs, virtual machine hypervisors, virtual machines, RAID groups, or logical volumes.

4. The method according to claim 1, further comprising:
   identifying an sub networks in the information system based on the collected information regarding the connections or dependencies between the first and second components.

5. The method according to claim 1,
   wherein classification of a component of the components is carried out according to a type of the component and a usage of the component.

6. The method according to claim 1, wherein the columns are vertical columns.

7. The method according to claim 1, wherein the columns are horizontal columns.

8. A non-transitory computer readable medium storing computer executable instructions for performing operations comprising:
   collecting information regarding connections or dependencies between components in an information system;
   classifying the components into a plurality of classes by classifying first components to a first class, and classifying second components to a second class;
   displaying a graphical topological representation of the information system, by performing operations including:
   (1) selecting one of the first components;
   (2) selecting two or more of the second components, which are connected to or depending from the one of the first components in the information system;
   (3) determining display positions of second icons representing the two or more of the second components, in a second column for the second class;
   (4) determining a display position of a first icon representing the one of the first components, in a first column for the first class;
   (5) determining a height of the first icon representing the one of the first components based on heights of the second icons representing the two or more of the second components, which are connected to or depending from the one of the first components in the information system; and (6) displaying the first icon and the second icons with the determined display positions and heights, wherein:
the graphical topological representation of the information system is displayed with a predetermined number of columns, and
the predetermined number of columns are predefined and fixed for display in the interface, and scaled to fit within a display provided on a computer monitor;
providing a sorting or filtering menu as part of the user interface; and
displaying a modified graphical topological representation of the information system in the user interface in accordance with the selected sorting or filtering criteria.

9. The non-transitory computer readable medium according to claim 8,
wherein the first and second components are hardware components or logical components.

10. The non-transitory computer readable medium according to claim 9,
wherein the hardware components comprise switches, computer nodes, storage nodes, or hard disk drives, and
wherein the logical components comprise LANSs, SANs, databases, web server programs, application server programs, virtual machine hypervisors, virtual machines, RAID groups, or logical volumes.

11. The non-transitory computer readable medium according to claim 8, further storing computer executable instructions for performing operations further comprising:
identifying any sub networks in the information system based on the collected information regarding the connections or dependencies between the first and second components.

12. The non-transitory computer readable medium according to claim 8,
wherein classification of a component of the components is carried out according to a type of the component and a usage of the component.

13. The non-transitory computer readable medium according to claim 8, wherein the columns are vertical columns.

14. The non-transitory computer readable medium according to claim 8, wherein the columns are horizontal columns.

15. A computer comprising:
a memory or storage, storing information regarding connections or dependencies between components in an information system; and
a CPU executing operations comprising:
classifying the components and into a plurality of classes by classifying first components to a first class, and classifying second components to a second class; and
displaying a graphical topological representation of the information system, by performing operations including:
(1) selecting one of the first components;
(2) selecting two or more of the second components, which are connected to or depending from the one of the first components in the information system;
(3) determining display positions of second icons representing the two or more of the second components, in a second column for the second class;
(4) determining a display position of a first icon representing the one of the first components, in a first column for the first class;
(5) determining a height of the first icon representing the one of the first components based on heights of the second icons representing the two or more of the second components, which are connected to or depending from the one of the first components in the information system; and
(6) displaying the first icon and the second icons with the determined display positions and heights, wherein:
the graphical topological representation of the information system is displayed with a predetermined number of columns, and
the predetermined number of columns are predefined and fixed for display in the interface, and scaled to fit within a display provided on a computer monitor;
providing a sorting or filtering menu as part of the user interface; and
displaying a modified graphical topological representation of the information system in the user interface in accordance with the selected sorting or filtering criteria.

16. The computer according to claim 15,
wherein the first and second components are hardware components or logical components.

17. The computer according to claim 16,
wherein the hardware components comprise switches, computer nodes, storage nodes, or hard disk drives, and
wherein the logical components comprise LANSs, SANs, databases, web server programs, application server programs, virtual machine hypervisors, virtual machines, RAID groups, or logical volumes.

18. The computer according to claim 15, wherein the CPU further executes an operation comprising:
identifying any sub networks in the information system based on the information regarding the connections or dependencies between the first and second components.

19. The computer according to claim 15,
wherein classification of a component of the components is carried out according to a type of the component and a usage of the component.

20. The computer according to claim 15, wherein the columns are horizontal columns.

21. The computer according to claim 15, wherein the columns are horizontal columns.

22. The method according to claim 1, wherein if at least one of the second icons does not represent a component, which is connecting to or depending from the one of the first components, and which is classified to the second class, and which does not satisfy the selected sorting or filtering criteria, then:
(a) the at least one of the second icons is not displayed after sorting or filtering, and
(b) the height of the first icon is not related to a height of the at least one of the second icons.

23. The method according to claim 1,
wherein the height of the first icon includes a space that is present between the second icons.

24. The method according to claim 1,
wherein the height of the first icon is greater than a height of a third icon, and
wherein the third icon represents a component, which is connected to or depending from the one of the first components, and which is classified to a third class.

25. The non-transitory computer readable medium according to claim 8, wherein if at least one of the second icons does not represent a component, which is connecting to or depending from the one of the first components, and which is classified to the second class, and which does not satisfy the selected sorting or filtering criteria, then:
(a) the at least one of the second icons is not displayed after sorting or filtering, and
(b) the height of the first icon is not related to a height of the at least one of the second icons.

26. The non-transitory computer readable medium according to claim 8,
wherein the height of the first icon includes a space that is present between the second icons.

27. The non-transitory computer readable medium according to claim 8,
wherein the height of the first icon is greater than a height of a third icon, and
wherein the third icon represents a component, which is connected to or depending from the one of the first components, and which is classified to a third class.

28. The computer according to claim 15, wherein if at least one of the second icons does not represent a component, which is connecting to or depending from the one of the first components, and which is classified to the second class, and which does not satisfy the selected sorting or filtering criteria, then:
(a) the at least one of the second icons is not displayed after sorting or filtering, and
(b) the height of the first icon is not related to a height of the at least one of the second icons.

29. The method according to claim 15,
wherein the height of the first icon includes a space that is present between the second icons.

30. The method according to claim 15,
wherein the height of the first icon is greater than a height of a third icon, and
wherein the third icon represents a component, which is connected to or depending from the one of the first components, and which is classified to a third class.

31. A non-transitory computer readable medium storing computer executable instructions for performing operations comprising:
collecting information regarding connections or dependencies between components in an information system;
classifying the components into a plurality of classes by classifying first components to a first class, and classifying second components to a second class;
displaying a graphical topological representation of the information system, by performing operations including:
(1) selecting one of the first components;
(2) selecting two or more of the second components, which are connected to or depending from the one of the first components in the information system;
(3) determining display positions of second icons representing the two or more of the second components, in a second column for the second class;
(4) determining a display position of a first icon representing the one of the first components, in a first column for the first class;
(5) determining a height of the first icon representing the one of the first components based on the number of the second icons representing the two or more of the second components, which are connected to or depending from the one of the first components in the information system; and
(6) displaying the first icon and the second icons with the determined display positions and heights, wherein:
the graphical topological representation of the information system is displayed with a predetermined number of columns, and
the predetermined number of columns are predefined and fixed for display in the interface, and scaled to fit within a display provided on a computer monitor;
providing a sorting or filtering menu as part of the user interface; and
displaying a modified graphical topological representation of the information system in the user interface in accordance with the selected sorting or filtering criteria.

32. The non-transitory computer readable medium according to claim 31,
wherein the first and second components are hardware components or logical components.

33. The non-transitory computer readable medium according to claim 32,
wherein the hardware components comprise switches, computer nodes, storage nodes, or hard disk drives, and
wherein the logical components comprise LANSs, SANs, databases, web server programs, application server programs, virtual machine hypervisors, virtual machines, RAID groups, or logical volumes.

34. The non-transitory computer readable medium according to claim 31, further storing computer executable instructions for performing operations further comprising:
identifying any sub networks in the information system based on the collected information regarding the connections or dependencies between the first and second components.

35. The non-transitory computer readable medium according to claim 31,
wherein classification of a component of the components is carried out according to a type of the component and a usage of the component.

36. The non-transitory computer readable medium according to claim 31, wherein the columns are vertical columns.

37. The non-transitory computer readable medium according to claim 31, wherein the columns are horizontal columns.

38. The non-transitory computer readable medium according to claim 31, wherein if at least one of the second icons does not represent a component, which is connecting to or depending from the one of the first components, and which is classified to the second class, and which does not satisfy the selected sorting or filtering criteria, then:
(a) the at least one of the second icons is not displayed after sorting or filtering, and
(b) the height of the first icon is not related to a height of the at least one of the second icons.

39. The non-transitory computer readable medium according to claim 31,
wherein the height of the first icon includes a space that is present between the second icons.

40. The non-transitory computer readable medium according to claim 31,
wherein the height of the first icon is greater than a height of a third icon, and
wherein the third icon represents a component, which is connected to or depending from the one of the first components, and which is classified to a third class.

41. A computer comprising:
a memory or storage, storing information regarding connections or dependencies between components in an information system; and
a CPU programmed to execute operations comprising:
classifying the components and into a plurality of classes by classifying first components to a first class, and classifying second components to a second class; and
displaying a graphical topological representation of the information system, by performing operations including:

(1) selecting one of the first components;

(2) selecting two or more of the second components, which are connected to or depending from the one of the first components in the information system;

(3) determining display positions of second icons representing the two or more of the second components, in a second column for the second class;

(4) determining a display position of a first icon representing the one of the first components, in a first column for the first class;

(5) determining a height of the first icon representing the one of the first components based on heights of the second icons representing the two or more of the second components, which are connected to or depending from the one of the first components in the information system; and (6) displaying the first icon and the second icons with the determined display positions and heights, wherein:

the graphical topological representation of the information system is displayed with a predetermined number of columns, and the predetermined number of columns are predefined and fixed for display in the interface, and scaled to fit within a display provided on a computer monitor;

providing a sorting or filtering menu as part of the user interface; and displaying a modified graphical topological representation of the information system in the user interface in accordance with the selected sorting or filtering criteria.

42. The computer according to claim 41, wherein the first and second components are hardware components or logical components.

43. The computer according to claim 42, wherein the hardware components comprise switches, computer nodes, storage nodes, or hard disk drives, and wherein the logical components comprise LANSs, SANs, databases, web server programs, application server programs, virtual machine hypervisors, virtual machines, RAID groups, or logical volumes.

44. The computer according to claim 41, wherein the CPU is further programmed to execute an operation comprising:

identifying any sub networks in the information system based on the information regarding the connections or dependencies between the first and second components.

45. The computer according to claim 41, wherein classification of a component of the components is carried out according to a type of the component and a usage of the component.

46. The computer according to claim 41, wherein the columns are vertical columns.

47. The computer according to claim 41, wherein the columns are horizontal columns.

48. The computer according to claim 41, wherein if at least one of the second icons does not represent a component, which is connecting to or depending from the one of the first components, and which is classified to the second class, and which does not satisfy the selected sorting or filtering criteria, then:

(a) the at least one of the second icons is not displayed after sorting or filtering, and (b) the height of the first icon is not related to a height of the at least one of the second icons.

49. The computer according to claim 41, wherein the height of the first icon includes a space that is present between the second icons.

50. The computer according to claim 41, wherein the height of the first icon is greater than a height of a third icon, and wherein the third icon represents a component, which is connected to or depending from the one of the first components, and which is classified to a third class.

51. The method according to claim 1, wherein the operations for displaying the graphical topological representation further include performing an operation of (7) displaying a plurality of lines between the first icon and the second icons, as objects indicating the connections or dependencies between components.

52. The non-transitory computer readable medium according to claim 8, wherein the operations for displaying the graphical topological representation further include performing an operation of (7) displaying a plurality of lines between the first icon and the second icons, as objects indicating the connections or dependencies between components.

53. The computer according to claim 15, wherein the operations for displaying the graphical topological representation further include performing an operation of (7) displaying a plurality of lines between the first icon and the second icons, as objects indicating the connections or dependencies between components.

54. The non-transitory computer readable medium according to claim 31, wherein the operations for displaying the graphical topological representation further include performing an operation of (7) displaying a plurality of lines between the first icon and the second icons, as objects indicating the connections or dependencies between components.

55. The computer according to claim 41, wherein the operations for displaying the graphical topological representation further include performing an operation of (7) displaying a plurality of lines between the first icon and the second icons, as objects indicating the connections or dependencies between components.

* * * * *